United States Patent
Ban et al.

(10) Patent No.: US 9,563,838 B2
(45) Date of Patent: Feb. 7, 2017

(54) LOOP ANTENNA AND RADIO FREQUENCY TAG

(71) Applicant: FUJITSU LIMITED, Kawasaki-shi, Kanagawa (JP)

(72) Inventors: Yasumitsu Ban, Yokohama (JP); Manabu Kai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/136,633

(22) Filed: Apr. 22, 2016

(65) Prior Publication Data

US 2016/0321535 A1    Nov. 3, 2016

(30) Foreign Application Priority Data

Apr. 28, 2015  (JP) .................................. 2015-092082
Feb. 25, 2016  (JP) .................................. 2016-034834

(51) Int. Cl.
| | |
|---|---|
| G06K 19/06  | (2006.01) |
| G06K 19/077 | (2006.01) |
| H01Q 1/22   | (2006.01) |
| H01Q 7/00   | (2006.01) |

(52) U.S. Cl.
CPC ...... *G06K 19/07788* (2013.01); *H01Q 1/2208* (2013.01); *H01Q 7/00* (2013.01)

(58) Field of Classification Search
USPC .......................... 235/492, 451; 343/748, 855
See application file for complete search history.

(56) References Cited

U.S. PATENT DOCUMENTS

| | | | |
|---|---|---|---|
| 6,597,318 B1* | 7/2003 | Parsche | H01Q 1/36 |
| | | | 343/700 MS |
| 9,325,070 B1* | 4/2016 | Obeidat | H01Q 9/0407 |
| 2003/0179152 A1 | 9/2003 | Watada et al. | |
| 2011/0121080 A1 | 5/2011 | Kai et al. | |
| 2012/0006904 A1 | 1/2012 | Kato et al. | |

(Continued)

FOREIGN PATENT DOCUMENTS

| | | |
|---|---|---|
| EP | 1 787 241 | 3/2006 |
| EP | 2 306 588 A1 | 4/2011 |

(Continued)

OTHER PUBLICATIONS

European Search Report of related European Patent Application No. 16 16 6861 dated Sep. 8, 2016.

*Primary Examiner* — Ahshik Kim
(74) *Attorney, Agent, or Firm* — Arent Fox LLP

(57) ABSTRACT

A loop antenna includes first and second conductors configured to have conductivity, the first conductor including first and second patterns, the first pattern being provided along a first surface and including a first feed point, and the second pattern being coupled to the first pattern at a first end of the first surface and being provided to oppose the first pattern; and a second conductor configured to have conductivity, the second conductor including third and fourth patterns, the third pattern being provided on the first surface with a gap generating a capacitance between the first pattern and including a second feed point, the fourth pattern being electrically coupled to the third pattern at a second end opposing the first end on the first surface, the fourth pattern overlapping the second pattern so as to cause capacitive coupling or being connected to the second pattern.

12 Claims, 16 Drawing Sheets

(56) References Cited

U.S. PATENT DOCUMENTS

| | | | | |
|---|---|---|---|---|
| 2015/0048991 A1* | 2/2015 | Pajona | .................... | H01Q 7/00 343/852 |
| 2015/0295311 A1* | 10/2015 | Bringuier | ............... | H01Q 5/307 343/729 |
| 2015/0303556 A1* | 10/2015 | Flores-Cuadras | ...... | H01Q 1/085 343/893 |

FOREIGN PATENT DOCUMENTS

| | | |
|---|---|---|
| EP | 2 390 826 A1 | 11/2011 |
| JP | 2000-216621 A | 8/2000 |
| JP | 2001-185972 A | 7/2001 |
| JP | 2002-198763 A | 7/2002 |
| JP | 2003-273627 A | 9/2003 |
| JP | 2011-109552 A | 6/2011 |
| JP | 2014-127752 A | 7/2014 |
| WO | WO 2006/021914 A1 | 3/2006 |

\* cited by examiner

LOOP ANTENNA AND RADIO FREQUENCY TAG

CROSS-REFERENCE TO RELATED APPLICATIONS

This application is based upon and claims the benefit of priority of the prior Japanese Patent Applications No. 2015-092082, filed on Apr. 28, 2015 and No. 2016-034834, filed on Feb. 25, 2016, the entire contents of which are incorporated herein by reference.

FIELD

The embodiments discussed herein are related to a loop antenna and a radio frequency tag including the loop antenna, for example.

BACKGROUND

Radio frequency identification (RFID) systems have conventionally been used in a variety of applications such as product management. Radio frequency tags used in RFID systems may be attached to various products. Proposals have thus been made for antennas suitable for radio frequency tags that exhibit a stable performance in any products to which a radio frequency tag is attached (for example, see Japanese Laid-open Patent Publication Nos. 2011-109552 and 2014-127752).

For example, Japanese Laid-open Patent Publication No. 2011-109552 discloses a loop antenna formed of a first conductor and a second conductor. In this loop antenna, the first conductor forms a first curved surface and includes a third terminal which is disposed at a first end of the first curved surface and coupled to the first terminal in a wireless communication circuit. The first conductor includes a first area at a second end of the first curved surface, the second end being at a side opposite to the first end. The second conductor forms a second curved surface and includes a fourth terminal which is disposed at a third end of the second curved surface and coupled to the second terminal in the wireless communication circuit. The second conductor includes a second area including at a fourth end of the second curved surface, the fourth end being at a side opposite to the third end. The second area is parallel to the first area and the first and second curved surfaces form the loop antenna.

Japanese Laid-open Patent Publication No. 2014-127752 discloses a transmission line with a line having an electrical length of an approximately half-wavelength transmission line that forms an approximately one wavelength transmission line by doubling and strip or linear parallel-line antenna having an approximately quarter-wavelength transmission line that forms an approximately half-wavelength transmission line by doubling.

This linear parallel-line antenna includes a metallic strip, which is disposed on a radiation surface for attaching a feed section or an IC, and a metallic strip, which is disposed below the metallic strip on the radiation surface, in a facing manner. The width of the lower metallic strip is slightly increased to suppress a change in an electrical field of a main transmission line when the antenna is mounted on a metallic surface.

SUMMARY

According to an aspect of the invention, a loop antenna includes a first conductor configured to have electrically conductivity, the first conductor including a first pattern and a second pattern, the first pattern being provided along a first surface and including a first feed point, and the second pattern being electrically coupled to the first pattern at a first end of the first surface and being provided to oppose the first pattern; and a second conductor configured to have electrically conductivity, the second conductor including a third pattern and a fourth pattern, the third pattern being provided on the first surface with a gap generating a capacitance between the first pattern and including a second feed point, the fourth pattern being electrically coupled to the third pattern at a second end opposing the first end on the first surface, the fourth pattern overlapping the second pattern so as to cause capacitive coupling or being connected to the second pattern, wherein at least a part of the first pattern is arranged closer to the second end than at least a part of the third pattern and the first feed point and the second feed point are provided so as to include the at least part of the first pattern in a path of current from the first feed point to the second feed point.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

It is desirable to decrease the size of antennas for radio frequency tags for some products in which a radio frequency tag is to be attached. However, size reduction of antennas leads to frequency characteristics of the antennas becoming increasingly sensitive with the variation in the size of parts of the antennas due to manufacturing errors.

Accordingly, it is desired to provide a loop antenna that suppresses the variation in frequency characteristics due to manufacturing errors.

Hereinafter, loop antennas will be described with reference to the drawings. Equivalent circuits of a loop antenna and a communication circuit using the loop antenna are described first to clarify factors contributing to frequency characteristics of a loop antenna.

Figure 1:
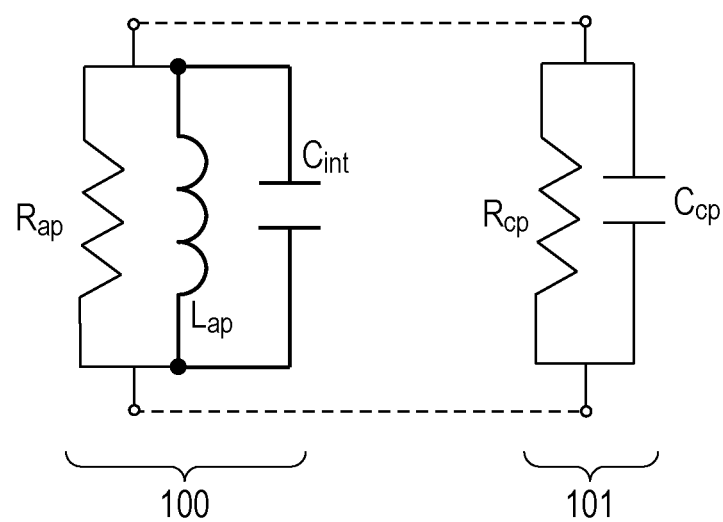
FIG. 1 is a diagram of equivalent circuits of a loop antenna and a communication circuit.

FIG. 1 is a diagram of equivalent circuits of a loop antenna and a communication circuit. The loop antenna is represented by an equivalent circuit 100 in which a resistor having a resistance value of $R_{ap}$, a coil having an inductance of $L_{ap}$, and a capacitor having a capacitance of $C_{int}$ are connected in parallel. The communication circuit connected to the loop antenna is represented by an equivalent circuit 101 in which a resistor having a resistance value $R_{cp}$ of approximately 2000Ω, for example, and a capacitor having a capacitance $C_{cp}$ of 1.0 pF, for example, are connected in parallel. In a radio frequency tag, the loop antenna and the communication circuit may be connected without using a matching circuit, so that matching is preferably performed for the impedances of the equivalent circuit 100 and the equivalent circuit 101 with respect to radio waves with an intended frequency. Specifically, the loop antenna and the communication circuit preferably satisfy a resonance condition for the intended frequency. When the loop antenna receives a radio wave and the resonance condition is satisfied, the loop antenna delivers the signal corresponding to the radio wave to the communication circuit. In other words, the loop antenna is capable of using radio waves in a frequency band around the intended frequency with a predetermined bandwidth. The resonance condition is represented by the equation below.

$$f0 = \frac{1}{2\pi\sqrt{L_{ap} \cdot (C_{int} + C_{cp})}} \qquad (1)$$

When the capacitances $C_{int}$ and $C_{cp}$ and the inductance $L_{ap}$ satisfy the resonance condition at a resonance frequency of f0 and $R_{ap}=R_{cp}$ holds and when the loop antenna receives radio waves, all of the power of the radio waves is supplied to the communication circuit.

Generally, the resistance value $R_{cp}$ and the capacitance $C_{cp}$ of the communication circuit are fixed. Thus, the capacitance $C_{int}$ or the inductance $L_{ap}$ is adjusted such that the resonance frequency f0 reaches an intended frequency, for example, the resonance frequency f0 being included in a frequency band of 860 MHz to 960 MHz used in the RFID system.

The inductance $L_{ap}$ of the coil in the equivalent circuit 100 increases as the loop length of the loop antenna, in other words, the length of the path in which current flows is longer. The capacitance $C_{int}$ is adjusted by the width of a gap between two conductors in an interdigital structure provided in the loop antenna, for example. As an example, the narrower the width of the gap between the two conductors in an interdigital structure, the higher the capacitance $C_{int}$. When the loop antenna has no structure generating a capacitance, such as an interdigital structure, the capacitance $C_{int}$ is 0.

The size of the loop antenna may be restricted by reducing the size of a radio frequency tag including the loop antenna. This makes it difficult to increase the loop length of the loop antenna in the conventional technology, which makes it difficult to increase the inductance $L_{ap}$. To achieve the resonance frequency f0 included in the frequency band allocated to the RFID system, there is no option but to increase the capacitance $C_{int}$. As a result, the width of the gap in the interdigital structure of the loop antenna becomes narrower.

However, the narrower the gap is, the larger the ratio of the variation in width of the gap due to a manufacturing error of the loop antenna to the width of the gap is, which leads to an increase in variation in the capacitance $C_{int}$ due to the manufacturing error of the loop antenna. As a result, frequency characteristics of the loop antenna vary markedly due to the manufacturing error of the loop antenna. This makes the allowable tolerance applied in the manufacturing of a loop antenna smaller, which is not preferable.

Thus, in a loop antenna of the embodiments, a loop length of the loop antenna is increased as much as possible up to a certain limit and the inductance $L_{ap}$ is increased to make the width of the gap in the interdigital structure generating a capacitance as wide as possible. To this end, in the loop antenna formed of two conductors wrapped around a rectangular substrate along the long-side direction of the substrate, a feed point of one of the conductors that is folded back at one end of the substrate is provided closer to the other end than a feed point of the other conductor folded back at the other end of the substrate opposing the one end. Consequently, the loop antenna enables the width of the gap formed between the two conductors to be wider by increasing a path of current flowing in the loop antenna.

In the following embodiments or modifications, for convenience of description, a surface of a substrate on which a feed point is provided is referred to as a front surface while a surface opposite to the front surface of the substrate is referred to as a back surface. A loop antenna is arranged such that a long-side direction of the substrate is the horizontal direction and a short-side direction of the substrate is the vertical direction. The up-and-down and right-to-left directions are defined relative to the loop antenna viewed from the front surface side. The length of the substrate in the short-side direction may be called the width of the substrate and the length of the substrate in the long-side direction may simply be called the length of the substrate.

Figure 2A:
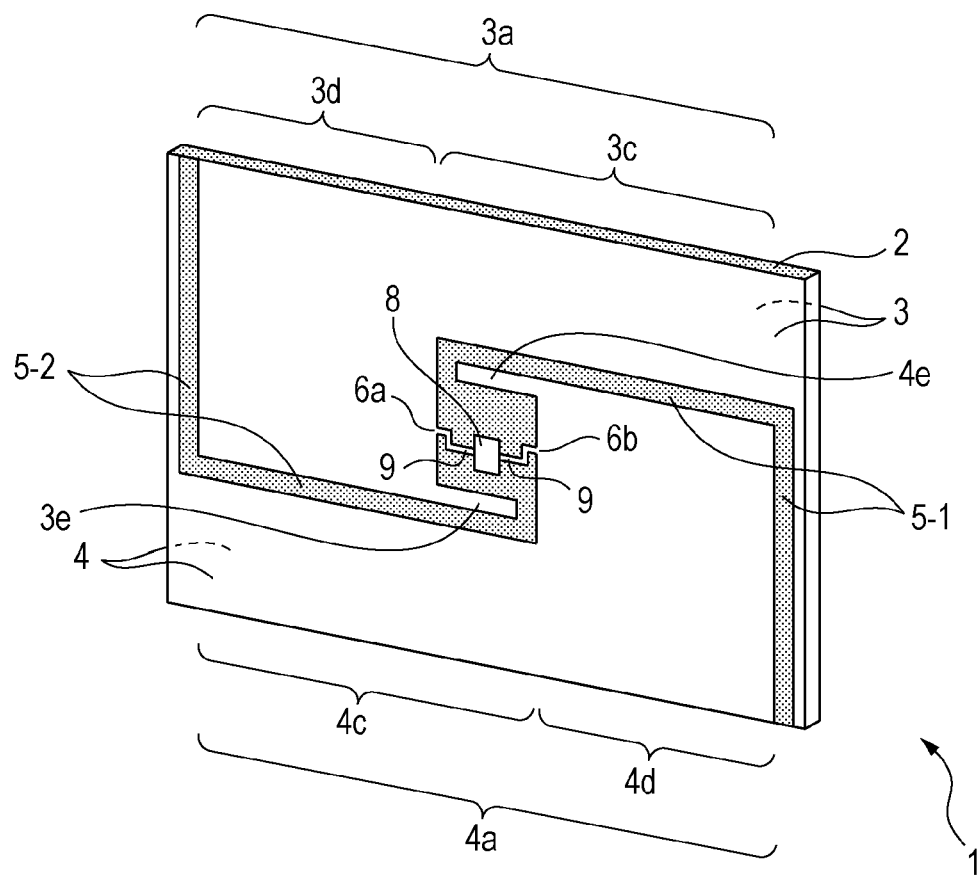
FIG. 2A is a schematic perspective view of a loop antenna according to a first embodiment.
Figure 2B:
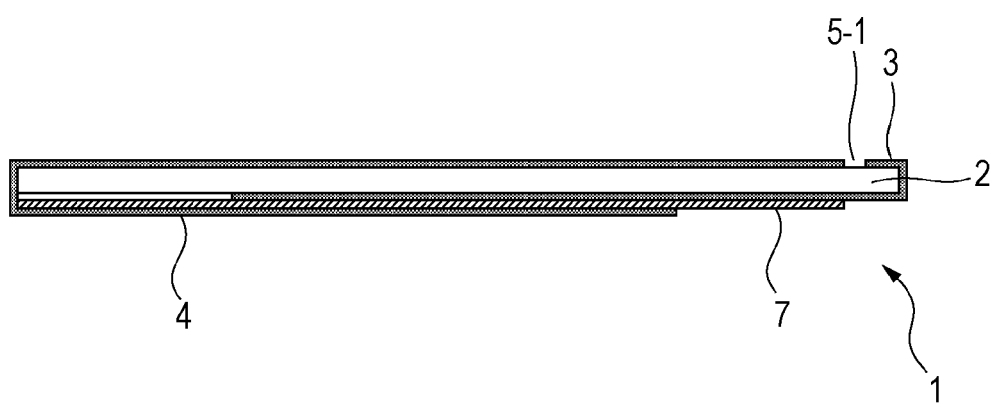
FIG. 2B is a schematic side view of the loop antenna according to the first embodiment.
Figure 3:
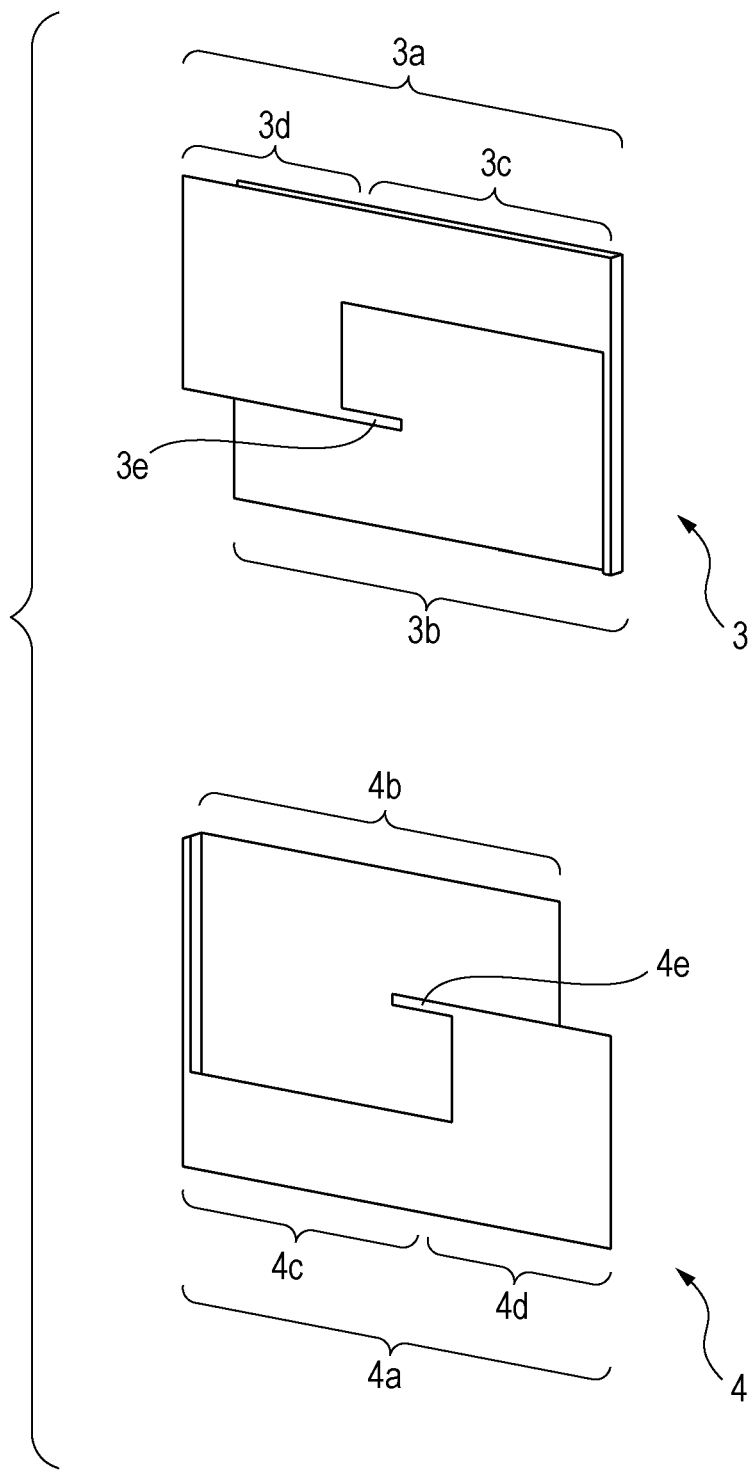
FIG. 3 is a developed view of parts of the loop antenna depicted in FIGS. 2A and 2B.

FIG. 2A is a schematic perspective view of a loop antenna according to a first embodiment. FIG. 2B is a schematic side view of the loop antenna according to the first embodiment. FIG. 3 is a developed view of parts of the loop antenna depicted in FIGS. 2A and 2B.

A loop antenna 1 according to the first embodiment includes a substrate 2, a first conductor 3, and a second conductor 4.

The substrate 2 is formed into a rectangular plate shape from a dielectric material of synthetic resin such as Acrylonitrile-butadiene-styrene (ABS) resin, polyethyleneterephthalate (PET) resin, and polycarbonate resin.

The first conductor 3 is a conductive metal such as copper or gold. The first conductor 3 has a shape in which a plane is bent into a U-shape at one end (right end in this example) of the substrate 2 in the long-side direction. One bent side of the first conductor 3 forms a first front surface pattern 3a arranged on the front surface of the substrate 2 while the other bent side forms a first back surface pattern 3b arranged on the back surface of the substrate 2. The first front surface pattern 3a and the first back surface pattern 3b are electrically connected to each other at the right end of the substrate 2.

The first front surface pattern 3a on the front surface of the substrate 2 includes, from the right end side of the substrate 2, a first connection portion 3c of a rectangle and a first end portion 3d of a rectangle. The first connection portion 3c is arranged from the portion near the right end of the substrate 2 to the portion beyond the midpoint of the substrate 2 in the long-side direction by a certain offset. The width of the first connection portion 3c along the short-side direction of the substrate 2 is less than ½ of the width of the substrate 2. The first end portion 3d is arranged between a left end of the first connection portion 3c and another end of the substrate 2 in the long-side direction (left end in this example). The width of the first end portion 3d along the short-side direction of the substrate 2 is wider than ½ of the width of the substrate 2. Upper sides of the first connection portion 3c and the first end portion 3d are parallel to the upper end of the substrate 2.

The first back surface pattern 3b on the back surface of the substrate 2 is formed into a rectangle so as to cover an overall area from the right end of the substrate 2 to a predetermined position from the left end of the substrate 2.

A second conductor 4 is also a conductive metal such as copper or gold. The second conductor 4 is formed into a shape analogous to that of the first conductor 3 so as to be center-point symmetric with the first conductor 3 with respect to the center of the front surface of the substrate 2. Specifically, the second conductor 4 has a shape in which a plane is bent into a U-shape at the left end of the substrate 2. One bent side of the second conductor 4 forms a second front surface pattern 4a arranged on the front surface of the substrate 2 while the other bent side of the second conductor 4 forms a second back surface pattern 4b arranged on the back surface of the substrate 2.

The second front surface pattern 4a arranged on the front surface of the substrate 2 includes, from the left end side of the substrate 2, a second connection portion 4c of a rectangle and a second end portion 4d of a rectangle. The second connection portion 4c is arranged from the portion near the left end of the substrate 2 to the portion beyond the midpoint of the substrate 2 in the long-side direction by a certain offset. The width of the second connection portion 4c along the short-side direction of the substrate 2 is less than ½ of the width of the substrate 2. The second end portion 4d is arranged between a right end of the second connection portion 4c and another end of the substrate 2 in the long-side direction (right end in this example). The width of the second end portion 4d along the short-side direction of the substrate 2 is wider than ½ of the width of the substrate 2. Lower sides of the second connection portion 4c and the second end portion 4d are parallel to a lower end of the substrate 2.

A gap 5-1 with a capacitance is formed between the first connection portion 3c of the first conductor 3 and the second end portion 4d of the second conductor 4. Likewise, a gap 5-2 with a capacitance is formed between the second connection portion 4c of the second conductor 4 and the first end portion 3d of the first conductor 3. This allows the capacitance $C_{int}$ of the loop antenna in the equivalent circuit 100 depicted in FIG. 1 to be larger than 0 in the loop antenna 1. The widths of the gaps 5-1 and 5-2 are determined based on inductance in accordance with the frequency band used by the loop antenna 1 and the electrical length of the loop antenna 1.

A projection 3e parallel to the second connection portion 4c is provided on a side opposing the right end of the substrate 2 in the first end portion 3d so as to provide a space between the projection 3e and the second connection portion 4c the same as that of the gap 5-1. Likewise, a projection 4e parallel to the first connection portion 3c is provided on a side opposing a left end of the second end portion 4d so as to provide a space between the projection 4e and the first connection portion 3c the same as that of the gap 5-2. This configuration achieves a longer gap between the first conductor 3 and the second conductor 4 to increase the capacitance, in the loop antenna 1. In addition, the projection 3e and the projection 4e are formed by extending the end portion 3d and the end portion 4d, so that increased inductance is also achieved in the loop antenna 1.

Additionally, an integrated circuit 8 that executes various processing, such as communication processing, of a radio frequency tag is arranged in a space between the side opposing the right end of the substrate 2 in the first end portion 3d of the first conductor 3 and the side opposing the left end of the substrate 2 in the second end portion 4d of the second conductor 4. On the side opposing the right end of the substrate 2 in the first end portion 3d of the first conductor 3, a first feed point 6a on the negative electrode side is provided, while on the side opposing the left end of the substrate 2 in the second end portion 4d of the second conductor 4, a second feed point 6b on the positive electrode side is provided. The feed point 6a and the feed point 6b are connected to each other through the integrated circuit 8 and a feed line 9.

This configuration allows a path of current flowing from the feed point 6a to the feed point 6b to include the first connection portion 3c and the second connection portion 4c which are aligned alternatively each other, which increases the length of the current path compared with the length along the long-side direction of the substrate 2. Consequently, the inductance $L_{ap}$ of the loop antenna in the equivalent circuit 100 depicted in FIG. 1 is increased satisfactorily without reducing radiation characteristics significantly in the loop antenna 1.

The second back surface pattern 4b of the second conductor 4 on the back surface of the substrate 2 is formed into a rectangle so as to cover an overall area from the left end of the substrate 2 to a predetermined position from the right end of the substrate 2. Thus, the first back surface pattern 3b of the first conductor 3 and the second back surface pattern 4b of the second conductor 4 have an overlapping area at which they overlap, on the back surface of the substrate 2. In the overlapping area, a film layer 7 that is an insulator and made of resin, for example, is provided between the first back surface pattern 3b and the second back surface pattern 4b. The loop antenna 1 thus has a capacitance in the overlapping area. Consequently, capacitive coupling occurs between the first conductor 3 and the second conductor 4 in a frequency band used by the loop antenna 1, thereby increasing the capacitance $C_{int}$ of the loop antenna in the equivalent circuit 100 depicted in FIG. 1.

The first conductor 3 is formed on the substrate 2 by deposition, for example. The second conductor 4 is, for example, deposited on the film layer 7 and wound around the substrate 2 together with the film layer 7 to be provided on the substrate 2. Alternatively, the first conductor 3 and the second conductor 4 may be formed on the substrate 2 or the film layer 7 by other various methods for forming a pattern of the conductor on the substrate of a dielectric material.

The loop antenna 1 may be contained in a casing formed of a non-dielectric material.

The following describes a frequency characteristic of the loop antenna 1 obtained by electromagnetic field simulation.

Figure 4A:
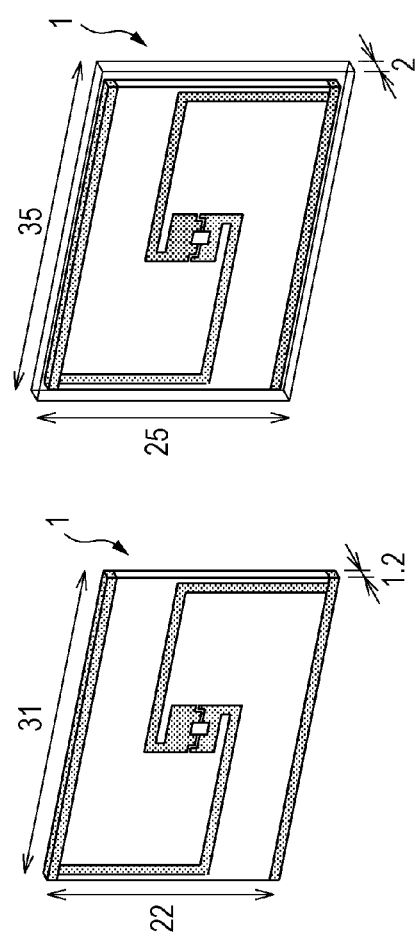
FIGS. 4A to 4C each depict the dimensions of the parts used for an electromagnetic field simulation for a frequency characteristic of the loop antenna according to the first embodiment.
Figure 4B:
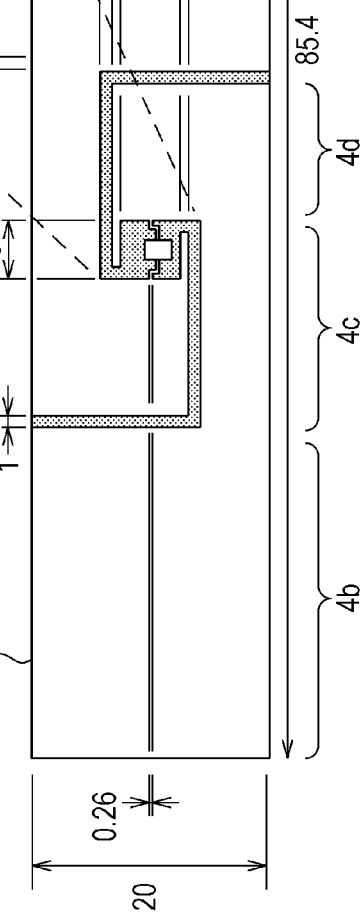
Figure 4C:
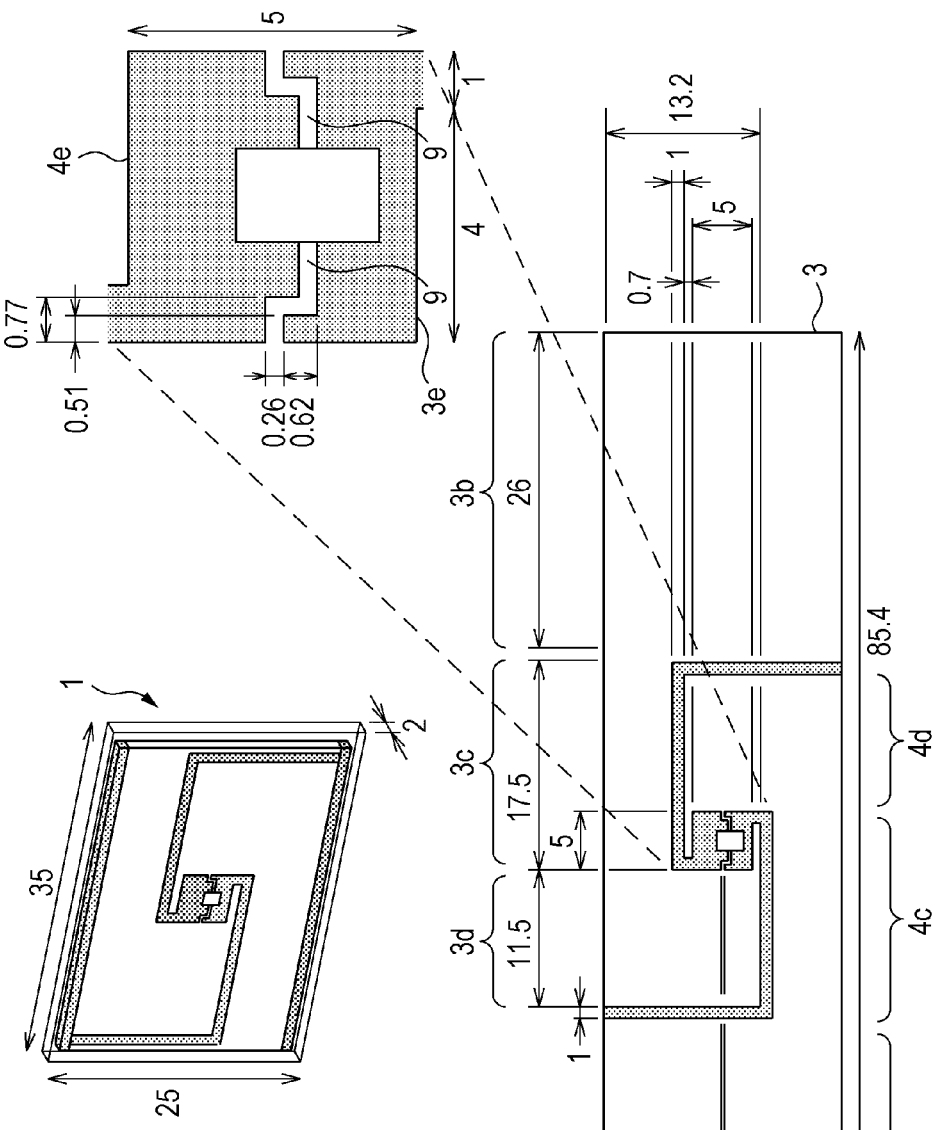

FIG. 4A to FIG. 4C each depict dimensions of parts used for the electromagnetic field simulation for the frequency characteristic of the loop antenna according to the first embodiment. FIG. 4A is a perspective view of the loop antenna 1 viewed from the front surface side. FIG. 4B is a perspective view of the casing containing the loop antenna 1 viewed from the front surface side. FIG. 4C is an expansion plan depicting a state in which the first conductor 3 and the second conductor 4 are developed into a plate. In this simulation, the relative permittivity ($\in_r$) of the substrate 2 is set to 3.2 and the dielectric loss tangent (tan δ) of the substrate 2 is set to 0.001. The length, width, and thickness of the substrate 2 are respectively set to 31 mm, 22 mm, and 1.2 mm.

The electrical conductivities of the first conductor 3 and the second conductor 4 are set to $5.8 \times 10^7$ (S/m). The widths of the first conductor 3 and the second conductor 4 along the short-side direction of the substrate 2 are set to 20 mm, without considering the connection portions and the end portions. The widths of the first connection portion 3c and the second connection portion 4c along the short-side direction of the substrate 2 are set to 5.8 mm. The lengths of the first connection portion 3c and the second connection portion 4c along the long-side direction of the substrate 2 are set to 17.5 mm. The widths of the first end portion 3d and the second end portion 4d along the short-side direction of the substrate 2 are set to 13.2 mm. The lengths of the first end portion 3d and the second end portion 4d along the long-side direction of the substrate 2 are set to 11.5 mm. The widths along the short-side direction of the substrate 2 are set to 0.7 mm and the lengths along the long-side direction of the substrate 2 are set to 4 mm in the projection 3e and the projection 4e. The space between the first end portion 3d and the second end portion 4d along the long-side direction of the substrate 2 and the space between the projection 3e and the projection 4e along the short-side direction of the substrate 2 are set to 5 mm respectively. The widths of the gap 5-1 and the gap 5-2 are set to 1 mm respectively.

The lengths of the first back surface pattern 3b and the second back surface pattern 4b along the long-side direction of the substrate 2 are set to 26 mm respectively. Specifically, the first back surface pattern 3b and the second back surface pattern 4b overlap each other on the back surface of the substrate 2 by 21 mm in the long-side direction of the substrate 2 and by 20 mm in the short-side direction of the substrate 2. The thickness of the film layer 7 is set to 0.1 mm. The relative permittivity and the dielectric loss tangent of the film layer 7 are set to be the same as those of the substrate 2.

The width of the feed line 9 connected to the first feed point 6a and the second feed point 6b is set to 0.26 mm. The first feed point 6a and the second feed point 6b are provided at the center point of the short-side direction in the substrate 2.

In this simulation, the loop antenna 1 is contained in the casing of a dielectric material with a relative permittivity and a dielectric loss tangent the same as those of the substrate 2. The length in the long-side direction, length in the short-side direction, and thickness of the casing are respectively set to 35 mm, 25 mm, and 2 mm.

Figure 5:
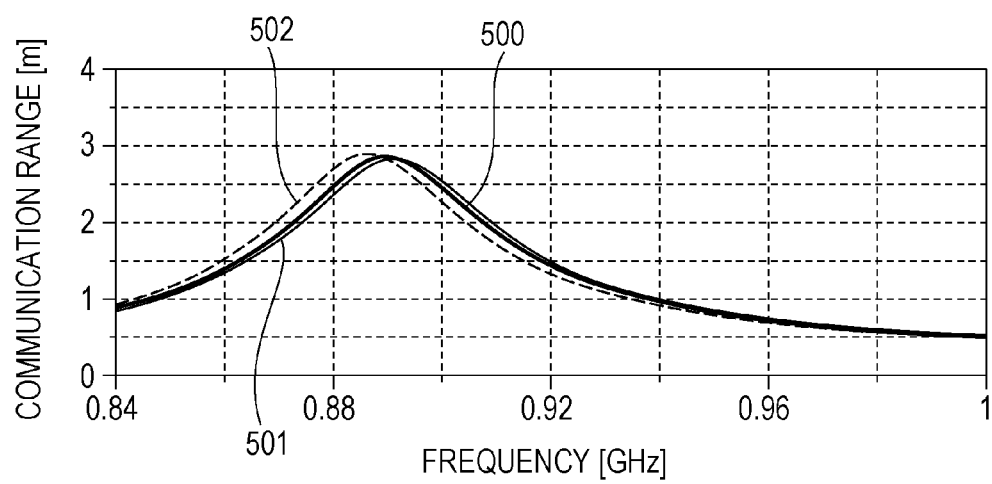
FIG. 5 is a view illustrating the relationship between the frequency and a communication range of the loop antenna according to the first embodiment, which is obtained from the electromagnetic field simulation.

FIG. 5 is a view illustrating the relationship between the frequency and a communication range of the loop antenna 1, which is obtained from the electromagnetic field simulation. In FIG. 5, the horizontal axis represents the frequency and the vertical axis represents the communication range. A graph 500 illustrates the relationship between the frequency and the communication range of the loop antenna 1 with the dimensions of the parts depicted in FIG. 4. A graph 501 illustrates the relationship between the frequency and the communication range of the loop antenna 1 when the spaces between the gaps 5-1 and 5-2, between the first end portion 3d and the second end portion 4d, and between the projections 3e and 4e were widened by 0.1 mm compared with those depicted in FIG. 4C. A graph 502 illustrates the relationship between the frequency and the communication range of the loop antenna 1 when the spaces between the gaps 5-1 and 5-2, between the first end portion 3d and the second end portion 4d, and between the two projections 3e and 4e were narrowed by 0.1 mm compared with those depicted in FIG. 4C.

As depicted in the graph 500 to graph 502, the loop antenna 1 has a substantially fixed maximum communication range even when the sizes of the gaps 5-1 and 5-2 and others are varied by ±0.1 mm. Moreover, the frequency corresponding to the maximum communication range varies only by ±2.3 MHz. It may be seen from these facts that the loop antenna 1 has a small variation in the frequency characteristic due to the manufacturing errors of the dimensions of the parts.

Figures 6A, 6B:
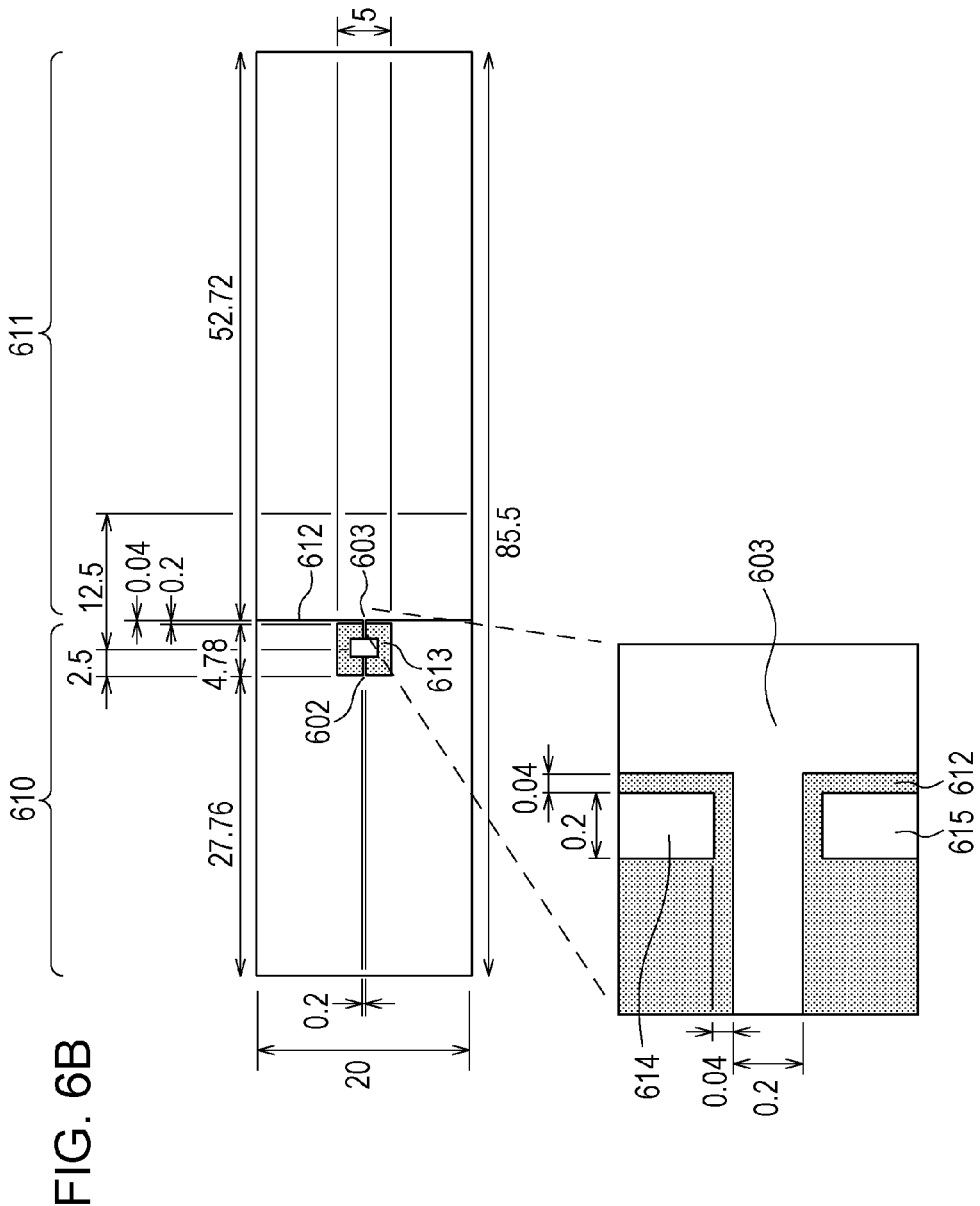
FIGS. 6A and 6B each depict the dimensions of parts used for an electromagnetic field simulation for the frequency characteristic of a loop antenna according to a comparative example.

FIG. 6A and FIG. 6B each depict the dimensions of the parts used for electromagnetic field simulation for the frequency characteristic of a loop antenna 600 according to a comparative example. FIG. 6A is a perspective view of the casing containing the loop antenna 600 viewed from the front surface side. FIG. 6B is a view of a state in which the two conductors forming the loop antenna 600 are developed into a plate. In this comparative example, the loop antenna 600 is formed by wrapping the conductors along the long-side direction of a substrate 601 with the same dimensions and physical properties (the relative permittivity $\in_r$=3.2 and the dielectric loss tangent tan δ=0.001) as those of the substrate 2 in the loop antenna 1 according to the first embodiment. However, a gap 612 for capacitance is formed along the short-side direction of the substrate 601 between a conductor 610 with a feed point 602 provided on the positive electrode side and a conductor 611 with a feed point 603 provided on the negative electrode side.

In this comparative example, the widths of the conductor 610 and the conductor 611 along the short-side direction of the substrate 601 are set to 20 mm. The conductor 610 has, near the gap 612, a space 613 for a circuit to feed power to the loop antenna 600. The size of the space 613 is set to 4.78 mm along the long-side direction of the substrate 601 and 5 mm along the short-side direction of the substrate 601. In the space 613, power is fed to the feed point 602 and the feed point 603 through a feed line with a width of 0.2 mm. To separate the space 613 and the gap 612, two projections 614 and 615 are formed along the short-side direction of the substrate 601 at an end on the gap 612 side of the conductor 610. The two projections 614 and 615 are set to have a width of 0.2 mm and a space between an end of the projection 614 and an end of the projection 615 of 0.208 mm. The feed line that feeds power to the feed point 603 is arranged in this space.

The width of the gap 612 is set to 0.04 mm so as to maximize the communication range of the loop antenna 600 at the frequency corresponding to the maximum communication range of the loop antenna 1.

The lengths of the conductor 610 and the conductor 611 on the back surface side of the substrate 601 along the long-side direction of the substrate 601 are set to 26 mm respectively. Specifically, the conductor 610 and the conductor 611 overlap each other on the back surface of the substrate 601 by 21 mm in the long-side direction of the substrate 601 and by 20 mm in the short-side direction of the substrate 601. The thickness of the film layer (not depicted) to be provided between the conductor 610 and the conductor 611 is set to 0.1 mm in the range over which the conductor 610 and the conductor 611 overlap each other. The relative permittivity and the dielectric loss tangent of the film layer are set to be the same as those of the substrate 601.

In this simulation, the loop antenna 600 is contained in the casing of a dielectric material with a relative permittivity and a dielectric loss tangent the same as those of the substrate 601. The length in the long-side direction, length in the short-side direction, and thickness of the casing are respectively set to 35 mm, 25 mm, and 2 mm.

Figure 7:
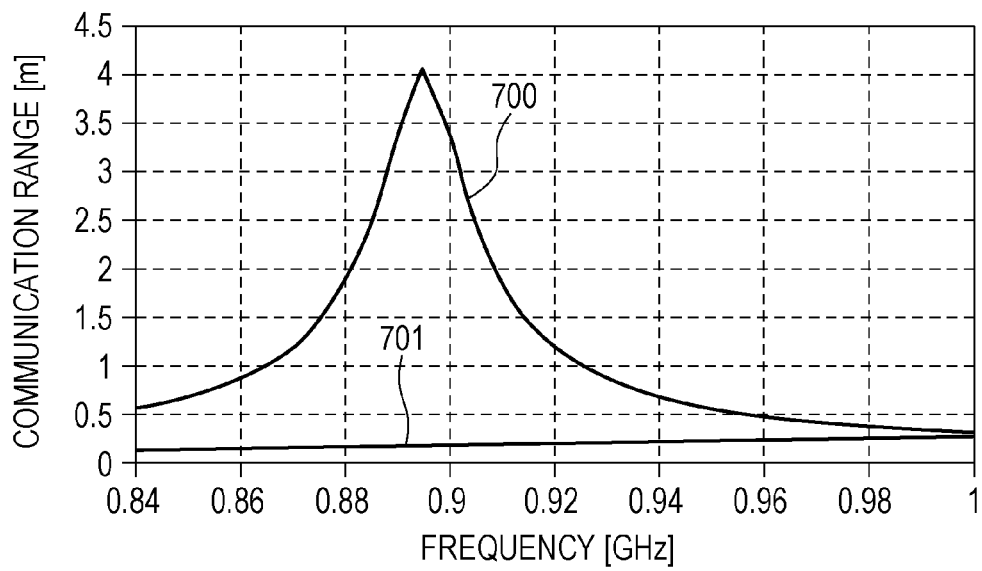
FIG. 7 is a view illustrating the relationship between the frequency and the communication range of the loop antenna according to the comparative example, which is obtained from the electromagnetic field simulation.

FIG. 7 is a view illustrating the relationship between the frequency and the communication range of the loop antenna 600, which is obtained from the electromagnetic field simulation. In FIG. 7, the horizontal axis represents the frequency and the vertical axis represents the communication range. A graph 700 illustrates the relationship between the frequency and the communication range of the loop antenna 600 with the dimensions of the parts depicted in FIG. 6. A graph 701 illustrates the relationship between the frequency and the communication range of the loop antenna 600 when the space of the gap 612 was widened by 0.1 mm compared with that depicted in FIG. 6.

As depicted in the graph 700 to graph 701, the maximum communication range in the loop antenna 600 is reduced significantly when the size of the gap 612 is varied by as small an amount as 0.1 mm. Additionally, the frequency corresponding to the maximum communication range is varied significantly by 100 MHz or more. It may be seen from these facts that the loop antenna 600 has a large variation in the frequency characteristic due to the manufacturing variations in the dimensions of the parts compared with the loop antenna 1.

As described above, the loop antenna according to the first embodiment is configured such that the two conductors wrapping the substrate along the long-side direction of the substrate are formed so that the end portion of one conductor and the end portion of the other conductor are aligned alternatively and power is fed to the end portions. In other words, the feed point of the one conductor is provided to the end at the folded-back portion of the other conductor closer to the other feed point of the other conductor. This loop antenna thus includes the alternate end portions on the current path between the two feed points to increase the path of current flowing in the loop antenna. This configuration increases the inductance $L_{ap}$ of the loop antenna and decreases the capacitance $C_{int}$ for the loop antenna. Consequently, this loop antenna is allowed to widen the gaps between the two conductors generating the capacitance, thereby suppressing the variation in the frequency characteristic caused by variation in the gap width due to a manufacturing error or the like.

Figure 8:
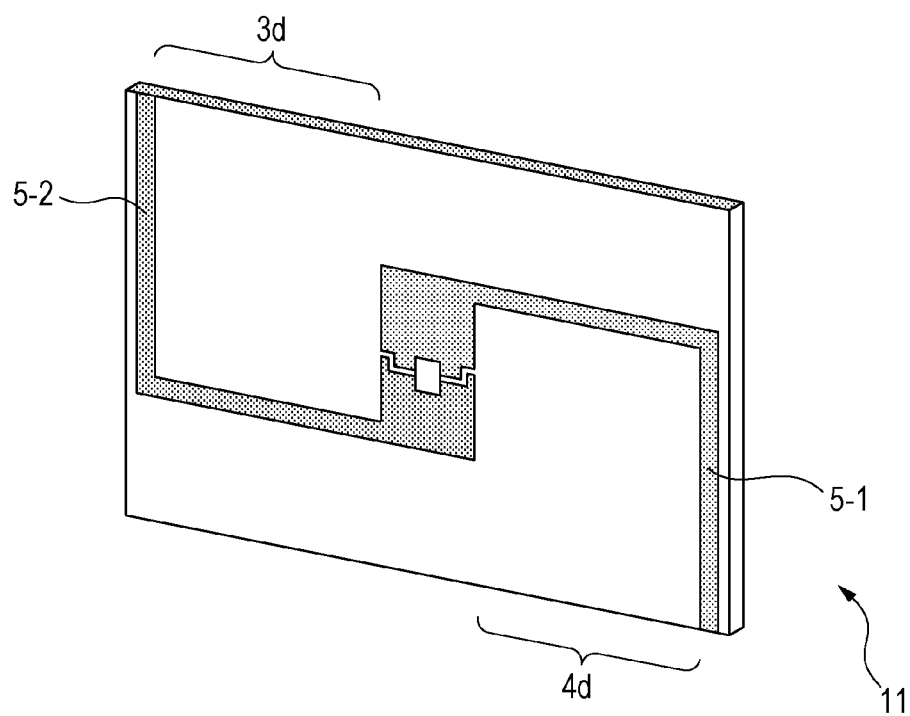
FIG. 8 is a schematic perspective view of a loop antenna according to a second embodiment viewed from a front surface side of the loop antenna.

FIG. 8 is a schematic perspective view of the loop antenna according to a second embodiment viewed from the front surface side of the loop antenna. In FIG. 8, components corresponding to those of the loop antenna 1 depicted in FIG. 2A and FIG. 2B are denoted by the same reference characters. A loop antenna 11 according to the second embodiment is different from the loop antenna 1 according to the first embodiment in that the projections in the end portions 3d and 4d of the conductors 3 and 4 are omitted. The distances of the gaps 5-1 and 5-2 between the two conductors in the loop antenna 11 according to the second embodiment are thus shorter by the distances of the projections than in the loop antenna 1. To provide the same capacitance and inductance as those of the loop antenna 1 to the loop antenna 11, the widths of the gaps 5-1 and 5-2 are made shorter than in the loop antenna 1, for example. Alternatively, to increase the inductance corresponding to the projections, the end portions 3d and 4d are made longer by the reduced widths of the connection portions 3c and 4c. The loop antenna 11 does not have a minute projection, which facilitates the manufacture of the loop antenna 11 compared with the loop antenna 1.

According to another embodiment, the surface patterns of the two conductors may be formed such that the gaps between the two conductors have a meandering shape.

Figure 9A:
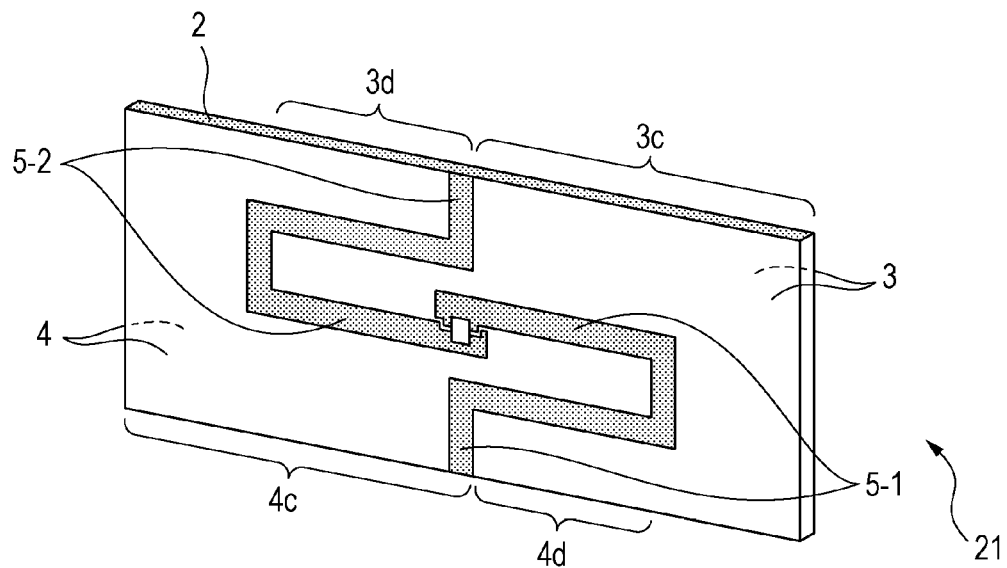
FIGS. 9A and 9B are schematic perspective views of loop antennas respectively according to third and fourth embodiments, viewed from the front surface side, in which a surface pattern of each of two conductor is formed such that gaps between the conductors have a meandering shape.
Figure 9B:
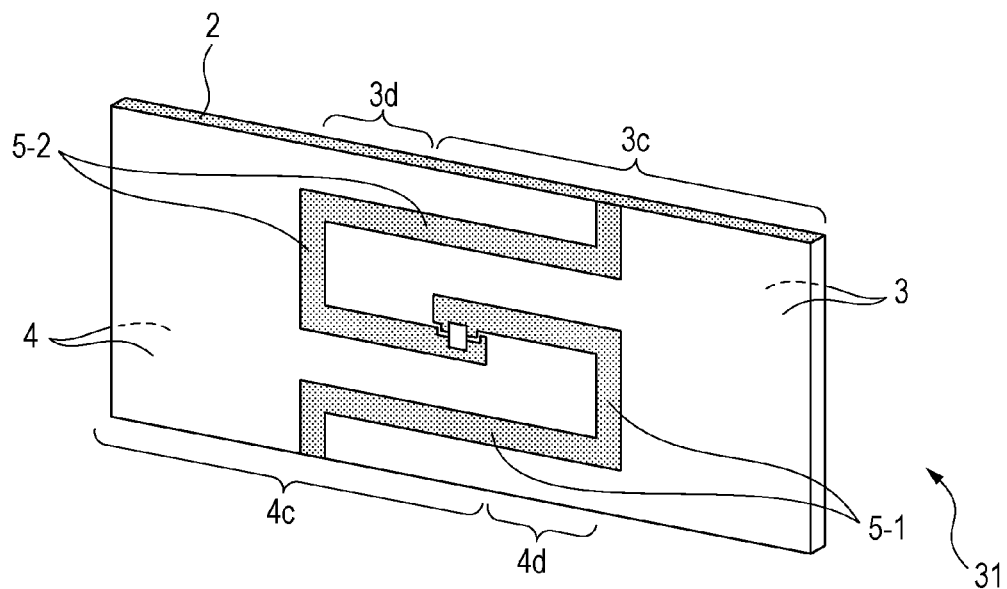

FIG. 9A and FIG. 9B are schematic perspective views of loop antennas respectively according to third and fourth embodiments, viewed from the front surface side, in which the surface pattern of each conductor is formed such that the gaps between the two conductors have a meandering shape. In FIGS. 9A and 9B, components corresponding to those of the loop antenna 11 depicted in FIG. 8 are denoted by the same reference characters.

A loop antenna 21 according to the third embodiment depicted in FIG. 9A is different from the loop antenna 11 depicted in FIG. 8 in that the width of a side on the upper side of the first end portion 3*d* is narrower at a central portion of the substrate 2 than a side on the upper side of the first connection portion 3*c*. The second conductor 4 extends to the right end side of the substrate 2 along the side on the upper side of the first end portion 3*d*. The width of a side on the lower side of the second end portion 4*d* of the second conductor 4 is likewise narrower at a central portion of the substrate 2 than a side on the lower side of the second connection portion 4*c*. The first conductor 3 extends to the left end side of the substrate 2 along the side on the lower side of the second end portion 4*d*. This configuration achieves a meandering shape of the gap 5-1 and the gap 5-2, thus obtaining the gaps 5-1 and 5-2 longer than in the loop antenna 11.

In a loop antenna 31 according to the fourth embodiment depicted in FIG. 9B, the first end portion 3*d* and the second end portion 4*d* as well as a part of the side on the upper side of the first connection portion 3*c* and a part of the side on the lower side of the second connection portion 4*c* are positioned at a central portion in the substrate 2 unlike the upper and lower ends of the substrate 2. This configuration allows the loop antenna 31 to have the gaps 5-1 and 5-2 longer than in the loop antenna 21.

As described above, the gaps 5-1 and 5-2 between the two conductors in the embodiments depicted in FIGS. 9A and 9B are longer than in the loop antennas in the previously-described embodiments. Thus, the loop antennas according to the third and fourth embodiments achieve wider widths of the gaps. As a result, the loop antennas according to the third and fourth embodiments further reduce the variation in the frequency characteristic due to the manufacturing error.

According to still another embodiment, the end portions of the conductors may be formed into a U-shape.

Figure 10:
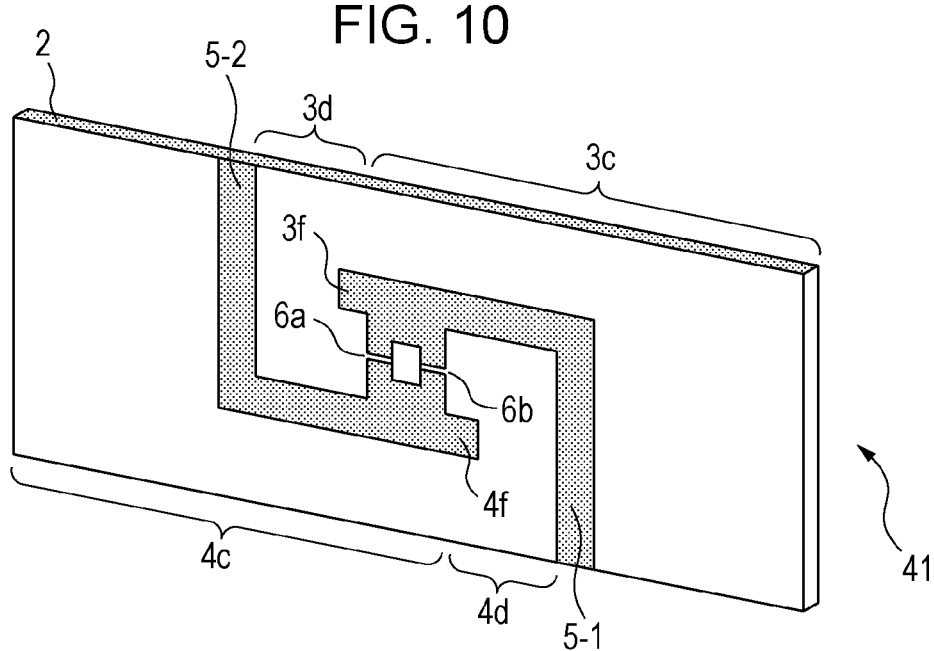
FIG. 10 is a schematic perspective view of a loop antenna according to a fifth embodiment viewed from the front surface side, in which the conductors are formed such that end portions of the conductors have a U-shape.

FIG. 10 is a schematic perspective view of a loop antenna according to a fifth embodiment viewed from the front surface side, in which the conductors are formed such that the end portions of the conductors have a U-shape. In FIG. 10, components corresponding to those of the loop antenna 11 depicted in FIG. 8 are denoted by the same reference characters.

A loop antenna 41 according to the fifth embodiment is configured to form a slit 3*f* between the feed point 6*a* and the first connection portion 3*c*. The slit 3*f* extends from a side on the side opposing the right end of the substrate 2 in the first end portion 3*d* to the left end side of the substrate 2. The first end portion 3*d* thus has a U-shape as depicted in FIG. 10. Likewise, a slit 4*f* is formed between the feed point 6*b* and the second connection portion 4*c*. The slit 4*f* extends from a side on the side opposing the left end of the substrate 2 in the second end portion 4*d* to the right end side of the substrate 2. The second end portion 4*d* thus has a U-shape as depicted in FIG. 10. Consequently, the loop antenna 41 has a longer path in which current flows and a narrower width of the current path in each end portion than the loop antennas according to the previously-described embodiments, thereby achieving larger inductance $L_{ap}$ and smaller capacitance $C_{int}$ for the loop antenna 41. As a result, the loop antenna 41 achieves wider widths of the gaps 5-1 and 5-2 to further reduce the variation in the frequency characteristic due to the manufacturing error. Moreover, in the loop antenna 41, a longer path in which current flows allows the resonance frequency f0 to shift to a low frequency side.

The extension directions of the slits 3*f* and 4*f* are not limited to the long-side direction. The slits 3*f* and 4*f* may be formed in any direction that obtains an increased path in which current flows. Alternatively, the slits 3*f* and 4*f* may be formed in a direction that obtains a narrower width of each conductor, in other words, a direction crossing the current path. As an example, the slit 3*f* may be formed upward from the boundary which is depicted in FIG. 10 as a boundary of the first end portion 3*d* and the first connection portion 3*c*. Likewise, the slit 4*f* may be formed downward from the boundary of the second end portion 4*d* and the second connection portion 4*c*. This configuration also reduces the widths of the conductors and increases the inductance $L_{ap}$.

To increase the inductance by reducing the widths of the conductors in the current path, a slit may be formed in the second conductor 4 from any side facing the gap 5-1 of the second conductor 4. For example, a slit may be formed toward the left end in any portion of the gap 5-1 in parallel to the short-side direction such as a side upper or lower than the slit 4*f*. Likewise, a slit may be formed in the first conductor 3 from any side facing the gap 5-2 of the first conductor 3. For example, a slit may be formed toward the right end in any portion of the gap 5-2 in parallel to the short-side direction such as a side upper or lower than the slit 3*f*. These slits may not be parallel to the long-side direction and may be formed to have an angle of 0° to 45° with respect to the long-side direction, for example.

To increase the inductance by reducing the widths of the conductors in the current path, a slit may further be formed downward from the upper end opposing the gap 5-1 of the first connection portion 3*c*. Likewise, a slit may further be formed upward from the lower end opposing the gap 5-2 of the second connection portion 4*c*. These slits may not be parallel to the short-side direction and formed to have an angle of 0° to 45° with respect to the long-side direction, for example. Alternatively, a slit downward from the upper end of the first conductor 3 may be formed in a portion between the gap 5-1 and the right end. A slit upward from the lower end of the second conductor 4 may be formed in a portion between the gap 5-2 and the left end.

The number of the slits formed in the first conductor 3 may not be limited to one. Plural slits may be formed. The number of the slits formed in the second conductor 4 may not be limited to one. Plural slits may be formed. In forming plural slits, for example, any two or more slits of the slits described above may be formed in the first conductor 3 and the second conductor 4. The slits are not limited to a linear slit but may be formed into an L-shape, an arc, a meandering shape, or the like. Moreover, one or more slits of the aforementioned slits may be formed only in any one of the first conductor 3 and the second conductor 4.

To lengthen the gaps 5-1 and 5-2, projections may be formed at both ends of the end portions in the loop antenna 41 by extending along the long-side direction of the substrate.

Figure 11:
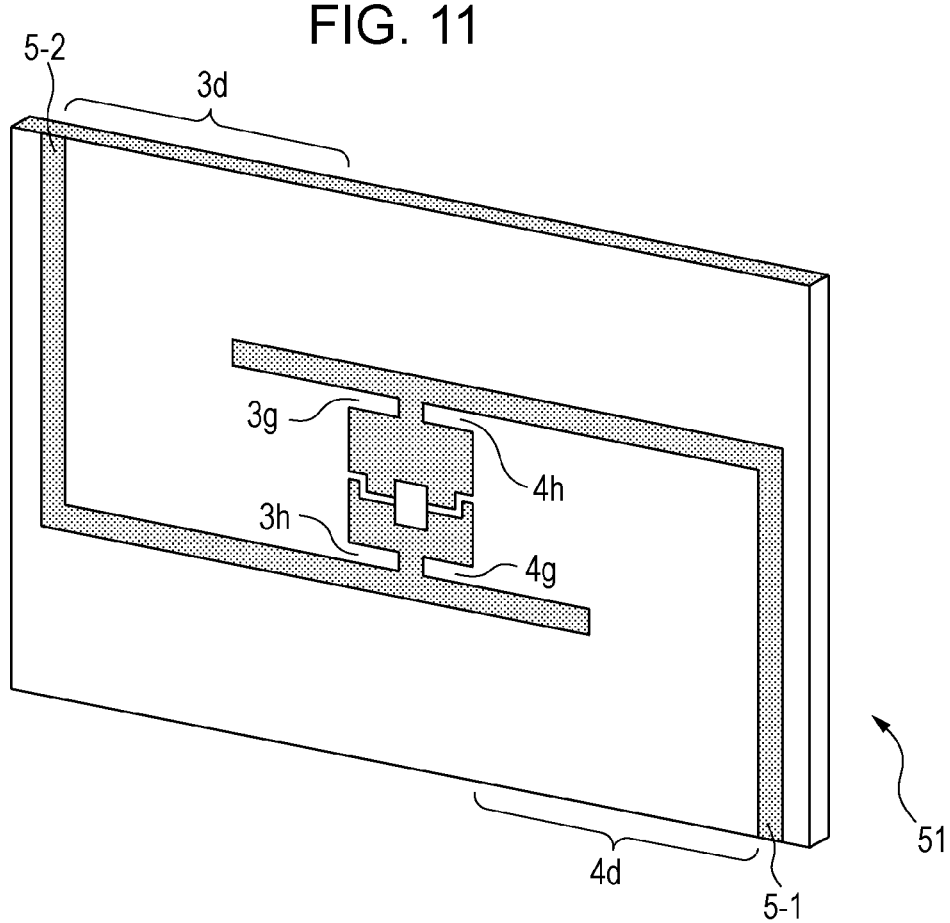
FIG. 11 is a schematic perspective view of a loop antenna with projections formed in the end portions according to a sixth embodiment viewed from the front surface side in the loop antenna depicted in FIG. 10.

FIG. 11 is a schematic perspective view of a loop antenna with projections formed in the end portions according to a sixth embodiment viewed from the front surface side in the loop antenna 41 depicted in FIG. 10. In FIG. 11, components corresponding to those of the loop antenna 41 depicted in FIG. 10 are denoted by the same reference characters.

In a loop antenna 51 according to the sixth embodiment, two projections 3g and 3h are formed by extending rightward along the long-side direction in the substrate 2 from the upper and lower ends of the edge in the first end portion 3d. Likewise, two projections 4g and 4h are formed by extending leftward along the long-side direction in the substrate 2 from the upper and lower ends of the edge in the second end portion 4d. This configuration of the loop antenna 51 allows the gaps 5-1 and 5-2 and the end portions 3d and 4d to be extended to widen the widths of the gaps compared with those in the loop antenna 41, which results in further reduction in the variation in the frequency characteristic due to the manufacturing error in the loop antenna 51. Instead, the widths of the gaps 5-1 and 5-2 are made the same as the widths of the gaps 5-1 and 5-2 in the loop antenna 41 to shift the resonance frequency f0 to a low frequency side. The projections may be formed into a meandering shape or into an L-shape by extending the edge from any point of the projection along the short-side direction.

In the loop antenna 41, the conductors may be formed to alternate two folded-back end portions so as to increase the path in which current flows.

Figure 12:
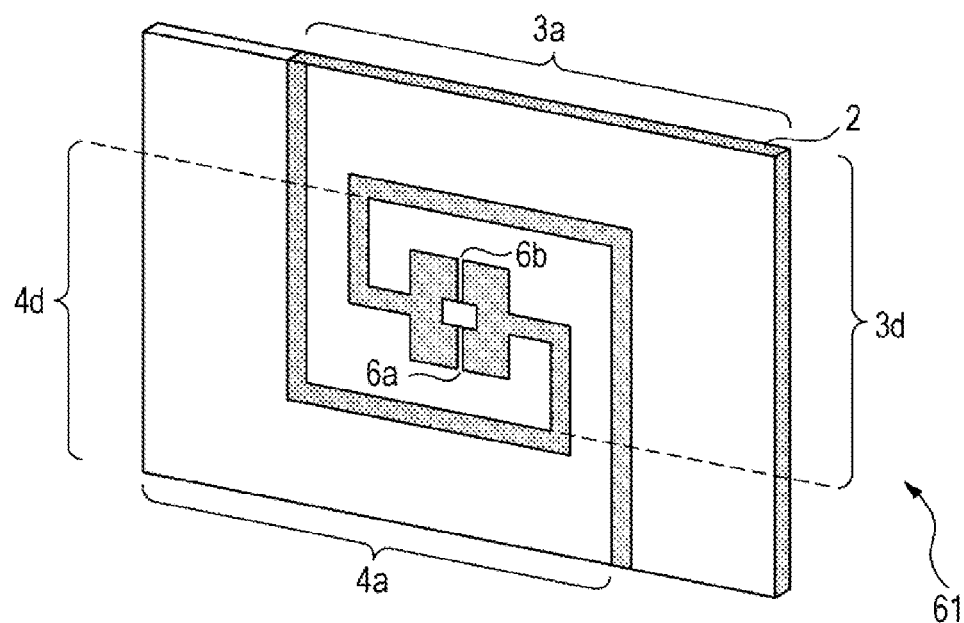
FIG. 12 is a schematic perspective view of a loop antenna according to a seventh embodiment viewed from the front surface side, in which the conductors are formed to alternate two folded-back end portions in the loop antenna depicted in FIG. 10.

FIG. 12 is a schematic perspective view of a loop antenna according to a seventh embodiment viewed from the front surface side, in which the conductors are formed to alternate two folded-back end portions in the loop antenna 41 depicted in FIG. 10. The loop antenna according to the seventh embodiment depicted in FIG. 12 is configured such that the end portions 3d and 4d of the conductors in the loop antenna depicted in FIG. 2A or the projections 3e and 4e of the conductors in the loop antenna depicted in FIG. 8 are extended to be formed in a rewound spiral. In FIG. 12, components corresponding to those of the loop antenna 41 depicted in FIG. 10 are denoted by the same reference characters.

In a loop antenna 61 according to the seventh embodiment, the edge of the first end portion 3d formed into a U-shape is arranged more rightward in the substrate 2 than the edge of the second end portion 4d, in the first front surface pattern 3a of the first conductor 3 extending from the right end side of the substrate 2. Conversely, the edge of the second end portion 4d formed into a U-shape is arranged more leftward in the substrate 2 than the edge of the first end portion 3d, in the second front surface pattern 4a of the second conductor 4 extending from the left end side of the substrate 2. The first end portion 3d and the second end portion 4d are thus alternate. The feed point 6a and the feed point 6b are provided such that the line connecting the feed point 6a and the feed point 6b are substantially parallel to the short-side direction of the substrate 2.

The first front surface pattern 3a is connected to the first back surface pattern at the lower end side of the substrate 2, while the second front surface pattern 4a is connected to the second back surface pattern at the upper end side of the substrate 2, thus achieving a longer path in which current flows.

The loop antenna 61 has a longer path in which current flows to increase the inductance $L_{ap}$ and decrease the capacitance $C_{int}$ for the loop antenna 61, compared with the loop antenna 41. Additionally, the gaps 5-1 and 5-2 are lengthened. As a result, in the loop antenna 61, wider widths of the gaps 5-1 and 5-2 are obtained to further reduce the variation in the frequency characteristic due to the manufacturing error. The loop antenna 61 allows the resonance frequency f0 to shift to a lower frequency side than in the loop antenna 41.

In the loop antenna 41, each conductor may be formed to have a shape of the back surface pattern in each conductor substantially the same as that of the front surface pattern in each conductor so as to increase the path in which current flows.

Figure 13:
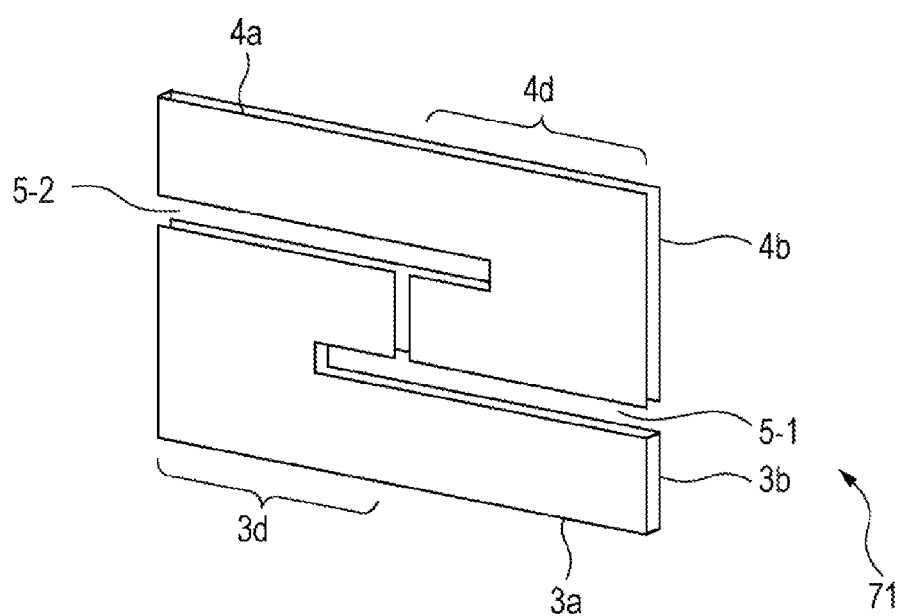
FIG. 13 is a perspective view depicting a shape of the conductors in a loop antenna according to an eighth embodiment, in which a shape of a back surface pattern in each conductor is formed into a shape substantially the same as that of a front surface pattern in each conductor in the loop antenna depicted in FIG. 10.

FIG. 13 is a perspective view depicting a shape of the conductors in a loop antenna according to an eighth embodiment, in which a shape of the back surface pattern in each conductor is formed into a shape substantially the same as that of the front surface pattern in each conductor in the loop antenna 41 depicted in FIG. 10. In FIG. 13, components corresponding to those of the loop antenna 41 depicted in FIG. 10 are denoted by the same reference characters.

In a loop antenna 71 according to the eighth embodiment, both of a shape combining the first front surface pattern 3a and the second front surface pattern 4a and a shape combining the first back surface pattern 3b and the second back surface pattern 4b form a reverse S-shape viewed from the front surface side. Specifically, when viewed from the direction vertical to the surface of the substrate 2, the first back surface pattern 3b and the second back surface pattern 4b have slits formed at the positions overlapping the gaps 5-1 and 5-2, respectively. The widths of the slits provided on the first back surface pattern 3b and the second back surface pattern 4b the may be the same as that of the gaps 5-1 and 5-2 or may be different from that of the gaps 5-1 and 5-2. The first front surface pattern 3a is electrically connected to the first back surface pattern 3b at the right end side. The second front surface pattern 4a is electrically connected to the second back surface pattern 4b at the left end side. Conversely, the first front surface pattern 3a is not connected to the first back surface pattern 3b at the left end side of the substrate 2. The second front surface pattern 4a is not connected to the second back surface pattern 4b at the right end side of the substrate 2. The first back surface pattern 3b and the second back surface pattern 4b are formed to overlap each other in the first end portion 3d and the second end portion 4d opposing each other, thereby achieving capacitive coupling.

The loop antenna 71 has a longer path in which current flows to increase the inductance $L_{ap}$ and decrease the capacitance $C_{int}$ for the loop antenna 71, compared with the loop antenna 41. Consequently, in the loop antenna 71, wider widths of the gaps 5-1 and 5-2 are obtained to further reduce the variation in the frequency characteristic due to the manufacturing error.

Moreover, the gaps between the first conductor 3 and the second conductor 4 may not be parallel to the long-side and short-side directions of the substrate 2.

Figure 14:
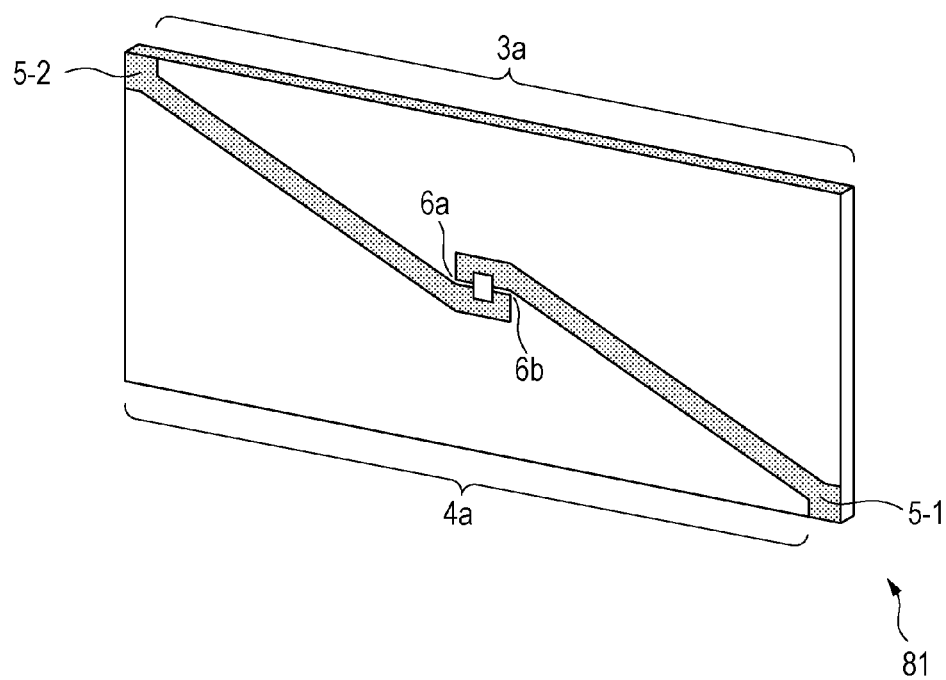
FIG. 14 is a schematic perspective view of a loop antenna according to a ninth embodiment, in which the two conductors are formed such that the gaps between the conductors extend along a diagonal direction of a substrate.

FIG. 14 is a schematic perspective view of a loop antenna according to a ninth embodiment, in which the two conductors are formed such that the gaps between the conductors extend along a diagonal direction of the substrate. In FIG. 14, components corresponding to those of the loop antenna 11 depicted in FIG. 8 are denoted by the same reference characters.

In a loop antenna 81 according to the ninth embodiment, the first front surface pattern 3a is formed, except for the portion to provide the feed point 6a, to have the width reduced as approaching the left end of the substrate 2 and bring the lower end of the first front surface pattern 3a closer to the upper end, in the front surface of the substrate 2.

Likewise, the second front surface pattern 4a is formed, except for the portion to provide the feed point 6b, to have the width reduced as approaching the right end of the substrate 2 and bring the upper end of the second front surface pattern 4a closer to the lower end. The gaps 5-1 and 5-2 are thus formed along the diagonal line of the substrate 2. Moreover, projections are formed respectively on the lower side of the first front surface pattern 3a and on the upper side of the second front surface pattern 4a, at the substantially central portion of the substrate 2. In the projections, the feed point 6a and the feed point 6b are provided to oppose to each other along the long-side direction of the substrate 2. This configuration of the loop antenna 81 allows a path in which current flows to be longer than the length along the long-side direction of the substrate 2 to achieve the increased inductance $L_{ap}$. Thus, the capacitance $C_{int}$ for the loop antenna 81 is also suppressed, so that wider widths of the gaps 5-1 and 5-2 are obtained to suppress the variation in the frequency characteristic due to the manufacturing error.

In the loop antennas in the embodiments described above, the two conductors may be formed to directly be connected to each other at the back surface side of the substrate. Alternatively, the two conductors may be formed as one conductor. In this case, a portion for capacitive coupling at the back surface side of the substrate is omitted, thereby reducing the capacitance of the loop antenna. The reduced capacitance is compensated by narrowing the gaps between the conductors on the front surface side of the substrate, for example.

In the loop antennas in the embodiments described above, furthermore, as the width of a portion corresponding to the path in which current flows in each conductor or the feed line varies due to a manufacturing error in processes such as etching, the inductance $L_{ap}$ also varies. Consequently, the resonance frequency f0 also varies. In particular, a portion with a narrower width in the path in which current flows exhibits a larger ratio of the variation in width of this portion due to a manufacturing error of the loop antenna to the width of this portion, which results in increased effects on the variation in the inductance $L_{ap}$. For example, in the loop antenna 11 depicted in FIG. 8, the variation in width of a portion along the short-side direction in the connection portion 3c has an effect on the variation in the inductance $L_{ap}$, the portion opposing the end portion 4d of the second conductor 4 with the gap 5-1 and being disposed between the gap 5-1 and the upper end of the loop antenna 11. Likewise, the variation in width along the short-side direction of a portion in the connection portion 4c of the second conductor 4 has an effect on the variation in the inductance $L_{ap}$, the portion opposing the end portion 3d of the first conductor 3 with the gap 5-2 and being disposed between the gap 5-2 and the lower end of the loop antenna 11.

As the resonance frequency f0 varies, the performance of the loop antenna deteriorates. Such a variation in the resonance frequency f0 is not preferable. For example, the variation in the resonance frequency f0 is preferably kept not greater than the allowable variation in antenna characteristic of the loop antennas according to the embodiments described above, for example, the allowable variation in communication range (10% to 20% of the communication range at the design frequency, for example).

Referring to Equation (1), when $L_{ap}(C_{int}+C_{cp})$ is constant, the resonance frequency f0 is also constant. In other words, it is desirable that the capacitance $C_{int}$ or $C_{cp}$ vary so as to suppress the variation in the resonance frequency f0 in accordance with variation in the inductance $L_{ap}$ due to a manufacturing error. This is represented by the equation below.

$$L_{ap} \cdot (C_{int}+C_{cp}) \approx (L_{ap}+\Delta L_{ap}) \cdot (C_{int}+\Delta C_{int}+C_{cp}+\Delta C_{cp}) \quad (2)$$

where $\Delta L_{ap}$ denotes variation in the inductance $L_{ap}$ due to a manufacturing error, and $\Delta C_{int}$ and $\Delta C_{cp}$ respectively denote variations in the capacitances $C_{int}$ and $C_{cp}$ due to the manufacturing error. As is apparent from Equation (2), to keep the resonance frequency f0 constant, it is desirable to decrease at least one of the capacitance $C_{int}$ or the capacitance $C_{cp}$, that is, $\Delta C_{int}<0$ or $\Delta C_{cp}<0$, when the inductance $L_{ap}$ is increased, that is, $\Delta L_{ap}>0$. Conversely, when the inductance $L_{ap}$ is reduced, that is, $\Delta L_{ap}<0$, it is desirable to increase at least one of the capacitance $C_{int}$ or the capacitance $C_{cp}$, that is, $\Delta C_{int}>0$ or $\Delta C_{cp}>0$.

Referring back to FIG. 8, the connection portions 3c and 4c, which have an effect mainly on the variation in the inductance $L_{ap}$, are respectively adjacent to the gaps 5-1 and 5-2, which produce the capacitance $C_{int}$. Thus, variation in the widths (along the short-side direction) of the connection portions 3c and 4c results in variation in the widths of the gaps 5-1 and 5-2.

Figure 15A:
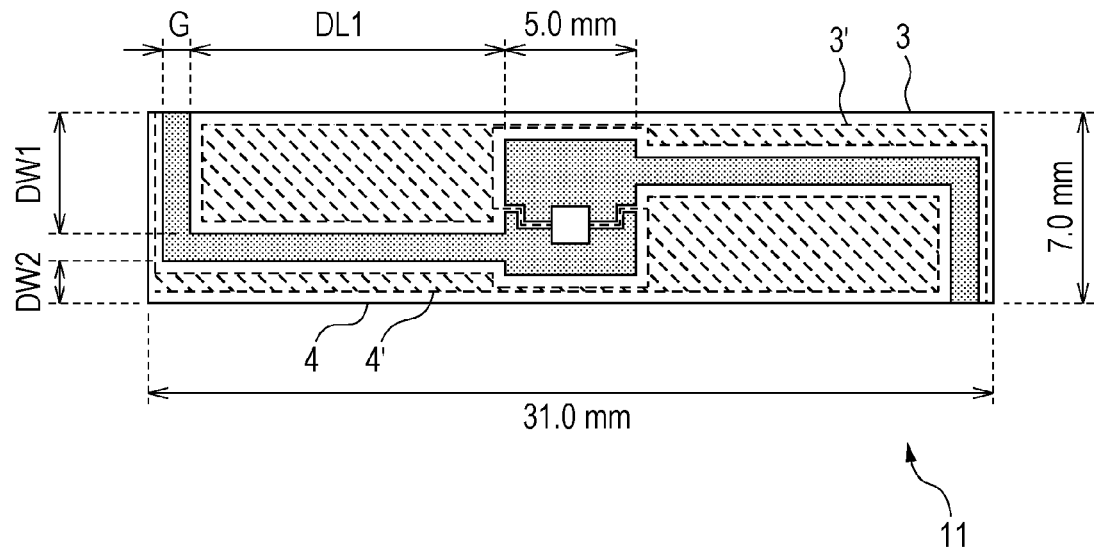
FIGS. 15A and 15B each depict an example of variation in the widths of the conductors and variation in the width of the gaps in the loop antenna depicted in FIG. 8 due to a manufacturing error of the loop antenna.
Figure 15B:
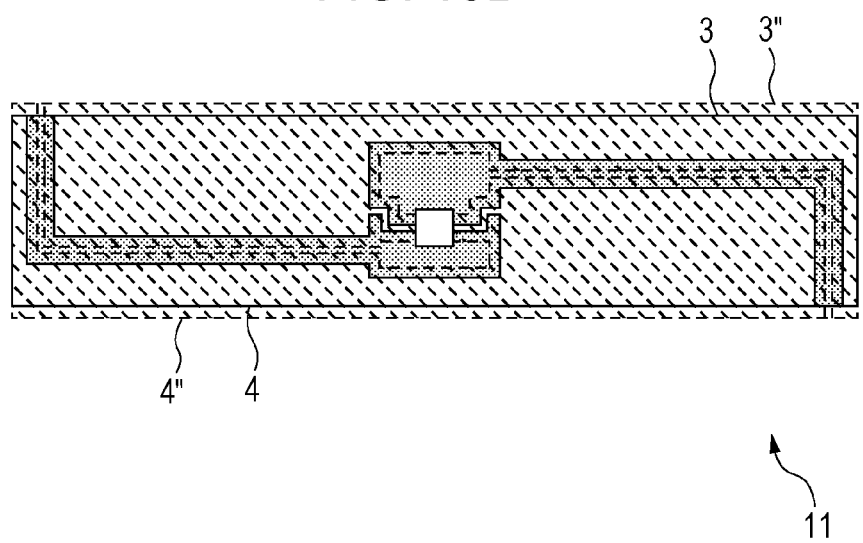

FIGS. 15A and 15B each depict an example of variation in the widths of the conductors and variation in the width of the gaps in the loop antenna 11 due to a manufacturing error of the loop antenna 11. As illustrated in FIG. 15A, as indicated by the broken lines, excessive etching creates conductors 3' and 4' having actual sizes smaller than the sizes of the conductors 3 and 4 determined using design values. Thus, the width (along the short-side direction) of the first conductor 3' and the width (along the short-side direction) of the second conductor 4' in the path in which current flows are respectively narrower than the width of the first conductor 3 and the width of the second conductor 4. The reduction in the width of the first conductor 3' and the width of the second conductor 4' in the path in which current flows results in an increase in the inductance $L_{ap}$, which is mainly generated by these conductors. In other words, $\Delta L_{ap}>0$ holds. The reduction in the actual sizes of the conductors 3' and 4' results in an increase in the widths of the gap 5-1 and the gap 5-2. The capacitance $C_{int}$, which is mainly generated by these gaps, is thus reduced. In other words, $\Delta C_{int}<0$ holds.

As illustrated in FIG. 15B, as indicated by the broken lines, insufficient etching creates conductors 3" and 4" having actual sizes larger than the sizes of the conductors 3 and 4 determined using the design values. Thus, the width (along the short-side direction) of the first conductor 3" and the width (along the short-side direction) of the second conductor 4" in the path in which current flows are respectively wider than the width of the first conductor 3 and the width of the second conductor 4. Consequently, the inductance $L_{ap}$, which is mainly generated by these conductors, is reduced. In other words, $\Delta L_{ap}<0$ holds. The increase in the actual sizes of the conductors 3" and 4" results in a reduction in the widths of the gap 5-1 and the gap 5-2. The capacitance $C_{int}$, which is mainly generated by these gaps, is thus increased. In other words, $\Delta C_{int}>0$ holds.

Also in the loop antennas according to the other embodiments, a reduction in the widths of portions where current flows in the conductors due to a manufacturing error results in an increase in the widths (along the short-side direction) of the gaps between the conductors, which generate a capacitance, while an increase in the widths of portions where current flows in the conductors due to a manufacturing error results in a reduction in the widths of the gaps.

In the loop antennas in the embodiments described above, accordingly, the variation in the widths of the conductors due to a manufacturing error causes the inductance $L_{ap}$ to increase, thereby causing a reduction in the capacitance $C_{int}$, while it causes the inductance $L_{ap}$ to decrease, thereby causing an increase in the capacitance $C_{int}$. It may be thus seen that the setting of the widths of the gaps and the widths of the conductors as appropriate allows Equation (2) to hold and keeps the resonance frequency f0 constant even when the widths of the conductors vary due to a manufacturing error.

Additionally, to reduce variation in the resonance frequency f0 due to a manufacturing error, it is preferable that the widths of the conductors be set so that the value on the right-hand side of Equation (2) with respect to the variation in the widths of the conductors becomes extreme in the absence of manufacturing errors. Specifically, it is preferable that the value on the right-hand side of Equation (2) be smaller (or larger) than the value on the right-hand side of Equation (2) in the absence of manufacturing errors whether the widths of the conductors are made narrow or wide due to a manufacturing error. This configuration allows the value on the right-hand side of Equation (2) to slowly change in accordance with the variation in the widths of the conductors, thereby suppressing variation in the resonance frequency f0 due to a manufacturing error.

For example, in the loop antenna 11, the widths of the connection portions 3c and 4c are relatively narrow, and the ratio of the variation in widths due to a manufacturing error to the widths is large. Thus, the effect of the variation in width of the connection portion 3c and the variation in width of the connection portion 4c on $\Delta L_{ap}$ is also relatively large. Accordingly, variation in the resonance frequency f0 due to a manufacturing error is suppressed by appropriately adjusting the ratio of the width of the connection portion 3c to the width of the gap 5-1 and the ration of the width of the connection portion 4c to the width of the gap 5-2.

Figure 16:
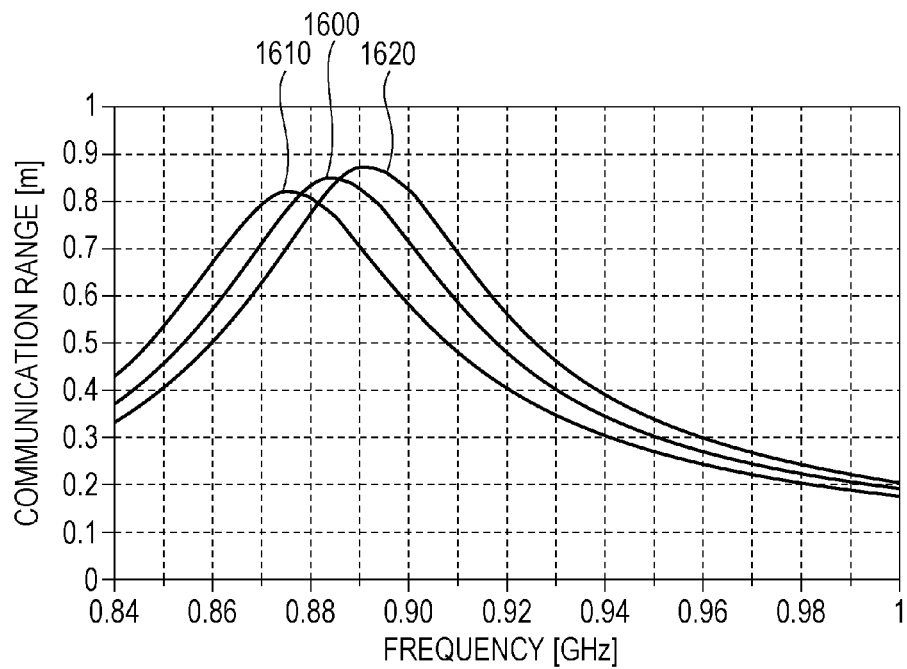
FIG. 16 depicts the results of an electromagnetic field simulation illustrating, for reference purposes, an example of the relationship between a manufacturing error and a resonance frequency f0 of the loop antenna depicted in FIG. 8 when the variation in the resonance frequency f0 caused by variation in inductance $L_{ap}$ due to the manufacturing error was not sufficiently suppressed.

FIG. 16 depicts the results of an electromagnetic field simulation illustrating, for reference purposes, an example of the relationship between a manufacturing error and the resonance frequency f0 of the loop antenna 11 when the variation in the resonance frequency f0 caused by variation in the inductance $L_{ap}$ due to the manufacturing error was not sufficiently suppressed. In this simulation, the relative permittivity ($\in_r$) of the substrate 2 is set to 3.2, and the dielectric loss tangent (tan δ) of the substrate 2 is set to 0.001. The lengths of the substrate 2 in the long-side and short-side directions are respectively set to 31 mm and 7 mm, and the thickness of the substrate 2 is set to 1.2 mm. The width G of each of the gap 5-1 and the gap 5-2 is set to 1.0 mm.

The conductivities of the first conductor 3 and the second conductor 4 are set to $5.8 \times 10^7$ (S/m). The width DW1 of each of the end portion 3d of the first conductor 3 and the end portion 4d of the second conductor 4 along the short-side direction of the substrate 2 is set to 4.4 mm, and the width DW2 of each of the connection portion 3c of the first conductor 3 and the connection portion 4c of the second conductor 4 along the short-side direction of the substrate 2 is set to 1.6 mm. In other words, G/DW2 is set to 0.625. Further, the width DL1 of each of the end portion 3d of the first conductor 3 and the end portion 4d of the second conductor 4 along the long-side direction of the substrate 2 is set to 11.5 mm. The lengths of an area where the integrated circuit 8 is provided along the long-side and short-side directions of the substrate 2 are set to 5 mm respectively. The first conductor 3 and the second conductor 4 are set to overlap each other on the back surface side of the substrate 2 by 5.1 mm in the long-side direction of the substrate 2 and by 7 mm in the short-side direction of the substrate 2.

In FIG. 16, the horizontal axis represents the frequency and the vertical axis represents the communication range. A graph 1600 illustrates a frequency characteristic of the loop antenna 11 in the absence of manufacturing errors. A graph 1610 illustrates a frequency characteristic of the loop antenna 11 when, as illustrated in FIG. 15A, the first conductor 3 and the second conductor 4 are each reduced in size by 0.05 mm along its outer periphery. In this example, thus, DW2 is set to 1.5 mm and G is set to 1.1 mm. A graph 1620 illustrates a frequency characteristic of the loop antenna 11 when, as illustrated in FIG. 15B, the first conductor 3 and the second conductor 4 are each increased in size by 0.05 mm along its outer periphery. In this example, thus, DW2 is set to 1.7 mm and G is set to 0.9 mm.

As depicted in the graphs 1600 to 1620, it may be seen that variation in the size of parts of the first conductor 3 and the second conductor 4 results in variation in a frequency that maximizes the communication range, or the resonance frequency f0.

Figure 17:
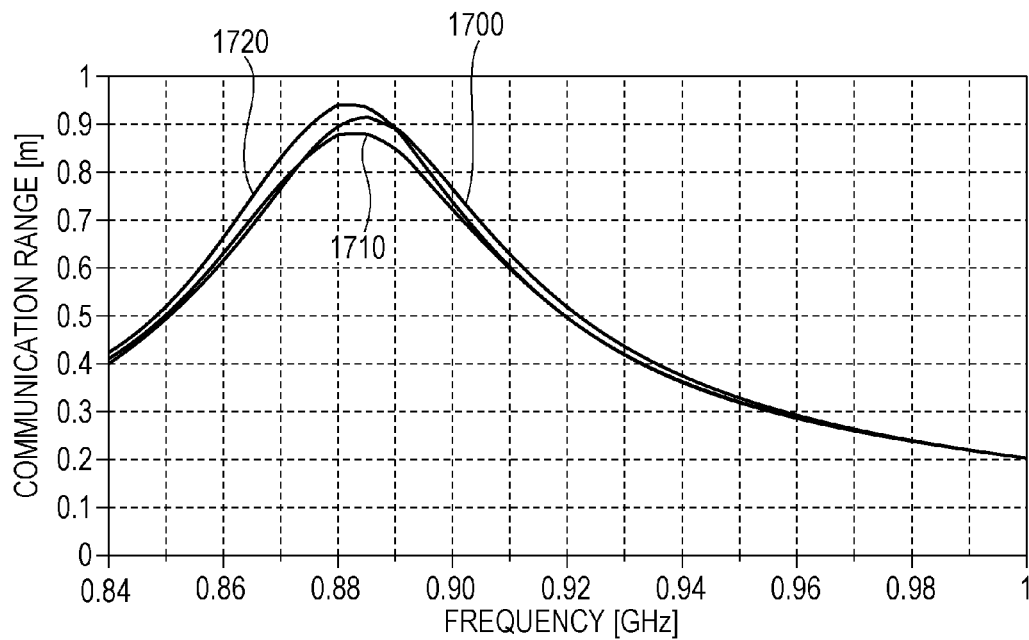
FIG. 17 depicts the results of an electromagnetic field simulation illustrating an example of the relationship between a manufacturing error and a resonance frequency f0 of the loop antenna depicted in FIG. 8 when the variation in the resonance frequency f0 caused by variation in inductance $L_{ap}$ due to the manufacturing error was appropriately suppressed.

FIG. 17 depicts the results of an electromagnetic field simulation illustrating an example of the relationship between a manufacturing error and the resonance frequency f0 of the loop antenna 11 when the variation in the resonance frequency f0 caused by variation in the inductance $L_{ap}$ due to the manufacturing error was appropriately suppressed. In this simulation, the width (G) of each of the gap 5-1 and the gap 5-2, is set to 0.3 mm. The width (DW1) of each of the end portion 3d of the first conductor 3 and the end portion 4d of the second conductor 4 along the short-side direction of the substrate 2 is set to 4.2 mm, and the width (DW2) of each of the connection portion 3c of the first conductor 3 and the connection portion 4c of the second conductor 4 along the short-side direction of the substrate 2 is set to 2.5 mm. In other words, G/DW2 is set to 0.12. Additionally, the width (DL1) of each of the end portion 3d of the first conductor 3 and the end portion 4d of the second conductor 4 along the long-side direction of the substrate 2 is set to 10.65 mm so that a resonance frequency substantially the same as the resonance frequency in the electromagnetic field simulation depicted in FIG. 16 may be obtained. Other properties of the substrate 2, such as dimensions and physical properties, which are the same as those used in the electromagnetic field simulation depicted in FIG. 16 are set.

In FIG. 17, the horizontal axis represents the frequency and the vertical axis represents the communication range. A graph 1700 illustrates a frequency characteristic of the loop antenna 11 in the absence of manufacturing errors. A graph 1710 illustrates a frequency characteristic of the loop antenna 11 when, as illustrated in FIG. 15A, the first conductor 3 and the second conductor 4 are each reduced in size by 0.05 mm along its outer periphery. In this example, thus, DW2 is set to 2.4 mm and G is set to 0.4 mm. A graph 1720 illustrates a frequency characteristic of the loop antenna 11 when, as illustrated in FIG. 15B, the first conductor 3 and the second conductor 4 are each increased in size by 0.05 mm along its outer periphery. In this example, thus, DW2 is set to 2.6 mm and G is set to 0.1 mm.

As depicted in the graphs 1700 to 1720, it may be seen that substantially no variation in a frequency that maximizes the communication range, or the resonance frequency f0, occurs even when the sizes of the parts of the first conductor 3 and the second conductor 4 vary. In this example, furthermore, the resonance frequency f0 depicted in the graph 1700 in the absence of manufacturing errors is higher than the resonance frequencies f0 depicted in the graph 1710 and the graph 1720 when the widths of the conductors are increased and reduced due to a manufacturing error. It may be thus seen that the widths of the conductors are set so that the value on the right-hand side of Equation (2) becomes extreme in the absence of manufacturing errors.

In some cases, as in the loop antenna 41 illustrated in FIG. 10, a portion where the narrowest width of each conductor is obtained in the path in which current flows is located between an end of one gap and the other gap. In this loop antenna, the variation in the resonance frequency f0 caused by variation in the inductance $L_{ap}$ due to a manufacturing error is suppressed, in a way similar to that described above, by appropriately adjusting the ratio of the width of one gap to the width of the portion between the one gap and an end of the other gap in each conductor.

Figure 18:
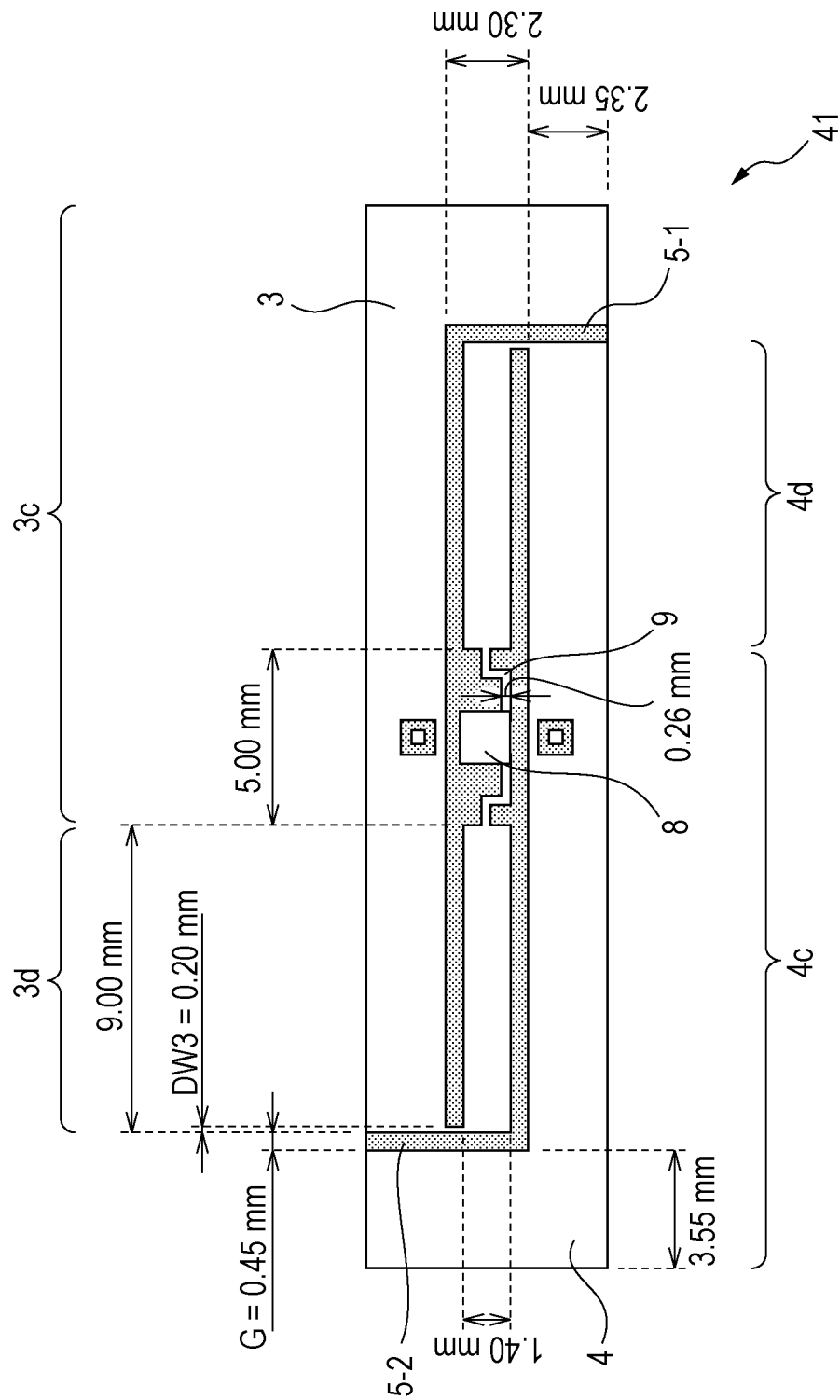
FIG. 18 depicts the dimensions of parts of the loop antenna depicted in FIG. 10 which is designed so as to appropriately suppress the variation in the resonance frequency f0 caused by variation in the inductance $L_{ap}$ due to a manufacturing error.

FIG. 18 depicts the dimensions of the parts of the loop antenna 41 which is designed so as to appropriately suppress the variation in the resonance frequency f0 caused by variation in the inductance $L_{ap}$ due to a manufacturing error. In this simulation, the relative permittivity ($\in_r$) of the substrate 2 is set to 3.2 and the dielectric loss tangent (tan δ) of the substrate 2 is set to 0.001. The lengths of the substrate 2 in the long-side and short-side directions are respectively set to 31 mm and 7 mm, and the thickness of the substrate 2 is set to 1.2 mm. The widths of the gap 5-1 and the gap 5-2 are denoted as G and set to 0.45 mm.

The conductivities of the first conductor 3 and the second conductor 4 are set to $5.8\times10^7$ (S/m). The widths of folded-back portions that are folded back toward the integrated circuit 8 in the end portion 3*d* of the first conductor 3 and the end portion 4*d* of the second conductor 4 along the short-side direction of the substrate 2 is set to 1.40 mm. The widths of portions of the end portion 3*d* and the end portion 4*d*, except for the folded-back portions, along the short-side direction of the substrate 2 are set to 2.35 mm. The lengths of the end portion 3*d* and the end portion 4*d* in the long-side direction of the substrate 2 are set to 9.00 mm. The width of portions that connect the folded-back portions of the end portion 3*d* and the end portion 4*d* to the portions other than the folded-back portions, DW3, in other words, the width of a portion between an end of the gap 5-1 and the gap 5-2 or a portion between an end of the gap 5-2 and the gap 5-1, is denoted as DW3 and set to 0.20 mm. In other words, G/DW3 is set to 2.25.

Further, the lengths of the connection portion 3*c* of the first conductor 3 and the connection portion 4*c* of the second conductor 4 along the long-side direction of the substrate 2 are set to 18 mm. The lengths of an area where the integrated circuit 8 is provided along the long-side and short-side directions of the substrate 2 are set to 5 mm respectively. The first conductor 3 and the second conductor 4 are set to overlap each other on the back surface side of the substrate 2 by 5.1 mm in the long-side direction of the substrate 2 and by 7 mm in the short-side direction of the substrate 2. The width of the feed line 9 is set to 0.26 mm.

Figure 19:
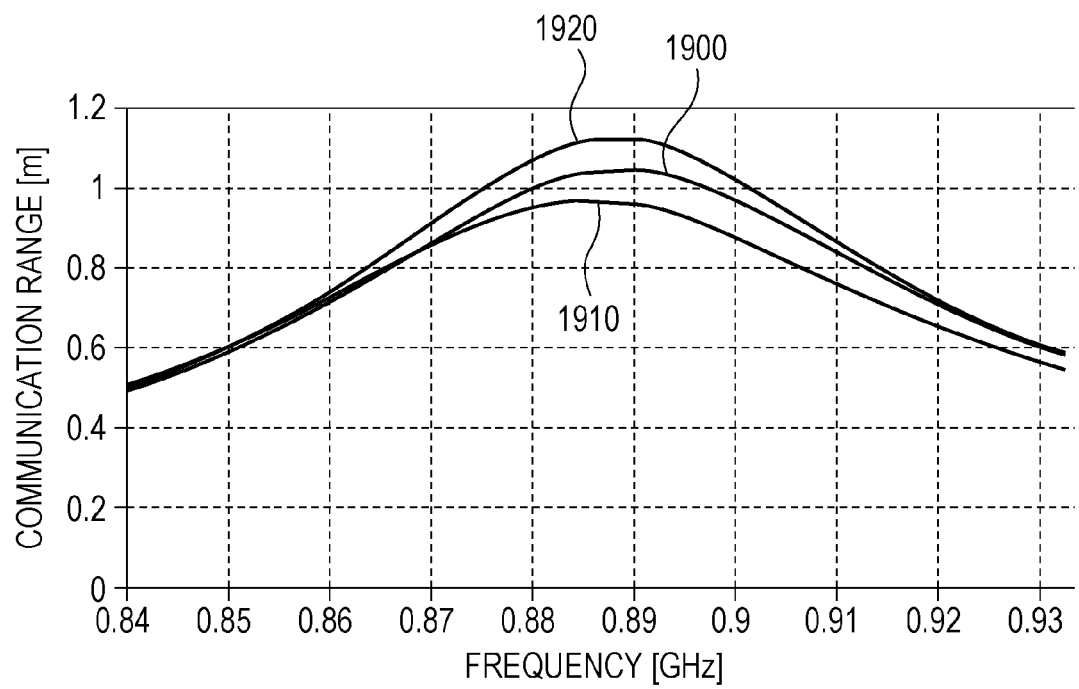
FIG. 19 depicts the results of an electromagnetic field simulation illustrating an example of the relationship between a manufacturing error and a resonance frequency f0 of the loop antenna depicted in FIG. 10 when the loop antenna was designed so as to appropriately suppress the variation in the resonance frequency f0 caused by variation in the inductance $L_{ap}$ due to a manufacturing error.

FIG. 19 depicts the results of an electromagnetic field simulation illustrating an example of the relationship between a manufacturing error and the resonance frequency f0 of the loop antenna 41 when the loop antenna 41 was designed so as to appropriately suppress the variation in the resonance frequency f0 caused by variation in the inductance $L_{ap}$ due to a manufacturing error.

In FIG. 19, the horizontal axis represents the frequency and the vertical axis represents the communication range. A graph 1900 illustrates a frequency characteristic of the loop antenna 41 in the absence of manufacturing errors. A graph 1910 illustrates a frequency characteristic of the loop antenna 41 when the first conductor 3 and the second conductor 4 are each reduced in size by 0.05 mm along its outer periphery. In this example, DW3 is set to 0.1 mm and G is set to 0.55 mm. A graph 1920 illustrates a frequency characteristic of the loop antenna 11 when the first conductor 3 and the second conductor 4 are each increased in size by 0.05 mm along its outer periphery. In this example, DW3 is set to 0.3 mm and G is set to 0.35 mm.

As depicted in the graphs 1900 to 1920, it may be seen that substantially no variation in a frequency that maximizes the communication range, or the resonance frequency f0, occurs even when the sizes of the parts of the first conductor 3 and the second conductor 4 vary. Also in this example, furthermore, the resonance frequency f0 depicted in the graph 1900 in the absence of manufacturing errors is higher than the resonance frequencies f0 depicted in the graph 1910 and the graph 1920 when the widths of the conductors are increased and reduced due to a manufacturing error. It may be thus seen that the widths of the conductors are set so that the value on the right-hand side of Equation (2) becomes extreme in the absence of manufacturing errors.

It may be seen from Equation (2) that the capacitance $C_{cp}$ may be varied so as to cancel the variation in the inductance $L_{ap}$ to suppress the variation in the resonance frequency f0 caused by variation in the inductance $L_{ap}$ due to a manufacturing error. Alternatively, the inductance $L_{ap}$ may be varied so as to cancel the variation in the capacitance $C_{cp}$ to suppress the variation in the resonance frequency f0 due to the variation in the capacitance $C_{cp}$.

Figure 20:
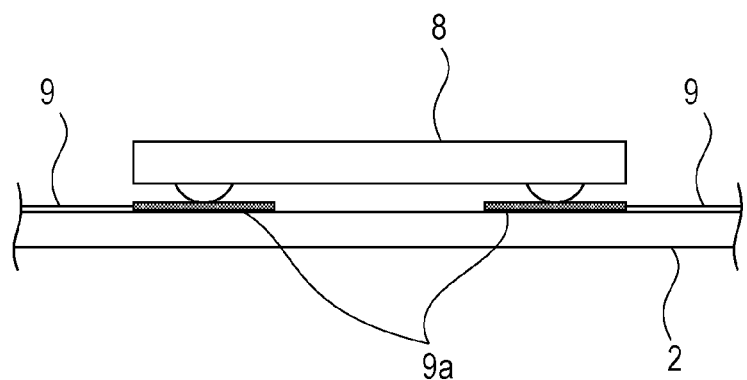
FIG. 20 is a schematic perspective view of an integrated circuit and a portion near the integrated circuit in the loop antenna depicted in FIG. 8.

FIG. 20 is a schematic perspective view of the integrated circuit 8 and a portion near the integrated circuit 8 in the loop antenna 11 according to the second embodiment. The capacitance $C_{cp}$ includes a component $C_{pad}$ generated in a gap between an attachment pattern 9*a* provided at an end portion of the feed line 9 to be connected to each conductor and the integrated circuit 8. The attachment pattern 9*a* is configured to be connected to the integrated circuit 8. The component $C_{pad}$ varies in accordance with the area of the attachment pattern 9*a* provided at an end of the feed line 9 and the width of the gap between the attachment pattern 9*a* and the integrated circuit 8. The attachment pattern 9*a* is formed as a pattern on the substrate 2, for example, similarly to each conductor. Thus, similarly to each conductor, the area of the attachment pattern 9*a* varies due to a manufacturing error in processes such as etching. Specifically, excessive etching creates the attachment pattern 9*a* with a reduced area in the manner as described above for the width of each conductor. Consequently, the area of a portion opposing the integrated circuit 8 in the attachment pattern 9*a* is reduced, which results in a reduction in the component $C_{pad}$. Conversely, insufficient etching creates the attachment pattern 9*a* with an increased area in the manner as described above for the width of each conductor. Consequently, the area of a portion opposing the integrated circuit 8 in the attachment pattern 9*a* is increased, which results in an increase in the component $C_{pad}$.

In the loop antennas in the embodiments described above, accordingly, an increase in the inductance $L_{ap}$ caused by variation in widths of conductors due to a manufacturing error results in a reduction in the capacitance $C_{pad}$, while a reduction in the inductance $L_{ap}$ results in an increase in the capacitance $C_{pad}$. It may thus be seen that an appropriate adjustment of the width of each conductor and the size of the attachment pattern allows Equation (2) to hold and keeps the resonance frequency f0 constant even when the widths of the conductors vary due to a manufacturing error.

As is apparent from Equation (2), the variation in the resonance frequency f0 caused by the variation in the inductance $L_{ap}$ may be suppressed by varying both the capacitance $C_{int}$ and the component $C_{pad}$ included in the capacitance $C_{cp}$. Accordingly, the variation in the resonance frequency f0 caused by variation in the inductance $L_{ap}$ due to a manufacturing error is also suppressed by appropriately adjusting the widths of the conductors, the widths of the gaps between the conductors, and the size of the attachment pattern.

In the loop antennas in the embodiments described above, the integrated circuit that feeds power to the conductors may be arranged at a position other than the center of the substrate. The integrated circuit may be arranged leftward or rightward relative to the center along the long-side direction of the substrate, for example. In this case, the lengths on the side to provide the feed points in the conductors along the long-side direction are also adjusted in accordance with the position of the integrated circuit. Moreover, in the loop antennas in the embodiments described above, the conductors may be formed so as to wrap the substrate along the short-side direction of the substrate. Furthermore, in the loop antennas in the embodiments described above, the width of the portion to provide each conductor on the front surface of the substrate along the direction perpendicular to the direction in which the conductor wraps the substrate may be different from the width of the portion to provide the conductor on the back surface side of the substrate.

For example, the substrate may be omitted when the conductors included in the loop antennas in the embodiments described above are supported by the casing containing the loop antenna.

Figure 21:
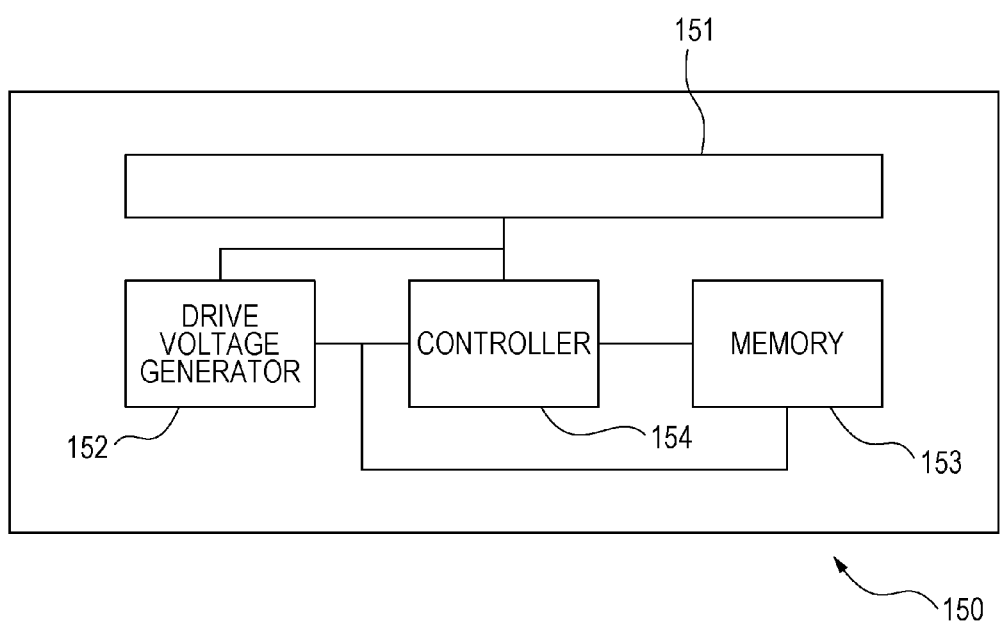
FIG. 21 is a block diagram of a radio frequency tag including the loop antenna according to any of the aforementioned embodiments or modifications thereof.

FIG. 21 is a block diagram of a radio frequency tag including the loop antenna according to any of the aforementioned embodiments or modifications thereof. This example includes a radio frequency tag 150 that is a passive RFID tag and includes a loop antenna 151, a drive voltage generator 152, a memory 153, and a controller 154. Of these components, the drive voltage generator 152, the memory 153, and the controller 154 are one example of a communication processing circuit that transmits or receives a radio signal through the loop antenna 151, which corresponds to the integrated circuit 8 depicted in FIG. 2A, for example. The drive voltage generator 152, the memory 153, and the controller 154 may be formed at a different part in one integrated circuit or formed as a circuit different from one another.

The loop antenna 151 is the loop antenna according to any of the aforementioned embodiments or modifications thereof. The loop antenna 151, for example, receives a radio wave emitted from a reader/writer (not depicted) with an interrogation signal including a preamble superimposed, converts the radio wave to an electrical signal, and delivers the resultant signal to the drive voltage generator 152 and the controller 154 that are connected to the feed point.

The drive voltage generator 152 uses the electrical signal received from the loop antenna 151, for example, uses the preamble portion included in the electrical signal, generates voltage for driving the memory 153 and the controller 154, and supplies the voltage to the memory 153 and the controller 154. Any of various elements that are used in the radio frequency tag and convert an electrical signal to voltage are applicable to the drive voltage generator 152.

The memory 153 includes a non-volatile semiconductor memory circuit and holds an identification (ID) code for identifying the radio frequency tag 150 from other radio frequency tags.

The controller 154 demodulates the electrical signal received from the loop antenna 151, retrieves the interrogation signal transported by the electrical signal, and generates a response signal for the interrogation signal. At this time, the controller 154 reads the ID code from the memory 153 and contains the ID code in the response signal to superimpose the response signal on an electrical signal with a frequency to be transmitted from the loop antenna 151. The controller 154 then outputs the electrical signal to the loop antenna 151 and causes the loop antenna 151 to emit the electrical signal as a radio wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A loop antenna comprising:
   a first conductor configured to have electrically conductivity, the first conductor including a first pattern and a second pattern, the first pattern being provided along a first surface and including a first feed point, and the second pattern being electrically coupled to the first pattern at a first end of the first surface and being provided to oppose the first pattern; and
   a second conductor configured to have electrically conductivity, the second conductor including a third pattern and a fourth pattern, the third pattern being provided on the first surface with a gap generating a capacitance between the first pattern and including a second feed point, the fourth pattern being electrically coupled to the third pattern at a second end opposing the first end on the first surface, the fourth pattern overlapping the second pattern so as to cause capacitive coupling or being connected to the second pattern,
   wherein at least a part of the first pattern is arranged closer to the second end than at least a part of the third pattern and the first feed point and the second feed point are provided so as to include the at least part of the first pattern in a path of current from the first feed point to the second feed point.

2. The loop antenna according to claim 1,
   wherein the first feed point is provided closer to the second end than the second feed point.

3. The loop antenna according to claim 2,
   wherein the first feed point is provided on a first side of the at least part of the first pattern, the first side opposing the at least part of the third pattern, and the second feed point is provided on a second side of the at least part of the third pattern, the second side opposing the at least part of the first pattern.

4. The loop antenna according to claim 3,
   wherein the first pattern further includes a projection extending from the first side to the first end along the third pattern and
   the third pattern further includes a projection extending from the second side to the second end along the first pattern.

5. The loop antenna according to claim 3,
wherein the first pattern includes a first slit, the first slit being formed between the first feed point and a connection portion that connects the at least part of the first pattern and the first end, the first slit extending in a direction from the first side toward the second end.

6. The loop antenna according to claim 3,
wherein the first pattern includes a first slit, the first slit being formed in a direction crossing the path of current, the current flowing between the first feed point and the second feed point through the first conductor and the second conductor.

7. The loop antenna according to claim 5,
wherein the second pattern and the fourth pattern include a second slit, the second slit being formed at a position overlapping the gap when viewed from a direction vertical to the first surface.

8. The loop antenna according to claim 1,
wherein the first pattern is formed such that a first side opposing the second end of the first pattern has a meandering shape, and the third pattern is formed such that a second side opposing the first end of the third pattern has a meandering shape along the first side and that the gap is formed between the first side and the second side.

9. The loop antenna according to claim 1, further comprising:
a substrate formed of a dielectric material, the substrate including the first surface,
wherein the second pattern and the fourth pattern are provided on a surface opposing the first surface of the substrate.

10. The loop antenna according to claim 1,
wherein a width of the gap and a size of portions of the first pattern and the third pattern that vary in size in accordance with variation in the width of the gap are set so that variation in a resonance frequency of the loop antenna caused by the variation in the size of the portions is suppressed by varying the width of the gap.

11. The loop antenna according to claim 10, further comprising:
an attachment pattern having conductivity and configured to attach, to the loop antenna, a circuit to be connected to the loop antenna,
wherein an area of the attachment pattern and the size of the portions of the first pattern and the third pattern are set so that the variation in the resonance frequency of the loop antenna caused by the variation in the size of the portions is suppressed by varying the area of the attachment pattern in accordance with the variation in the size of the portions.

12. A radio frequency tag comprising:
a loop antenna configured to include a first feed point and a second feed point; and
a communication processing circuit configured to be connected to the loop antenna through a feed line that feeds power to the first feed point and the second feed point and configured to transmit or receive a radio signal through the loop antenna,
wherein the loop antenna includes
a first conductor configured to have electrically conductivity, the first conductor including a first pattern and a second pattern, the first pattern being provided along a first surface and including a first feed point, and the second pattern being electrically coupled to the first pattern at a first end of the first surface and being provided to oppose the first pattern; and
a second conductor configured to have electrically conductivity, the second conductor including a third pattern and a fourth pattern, the third pattern being provided on the first surface with a gap generating a capacitance between the first pattern and including a second feed point, the fourth pattern being electrically coupled to the third pattern at a second end opposing the first end on the first surface, the fourth pattern overlapping the second pattern so as to cause capacitive coupling or being connected to the second pattern,
wherein at least a part of the first pattern is arranged closer to the second end than at least a part of the third pattern and the first feed point and the second feed point are provided so as to include the at least part of the first pattern in a path of current from the first feed point to the second feed point.

* * * * *